United States Patent
Terayama et al.

(10) Patent No.: US 7,634,185 B2
(45) Date of Patent: Dec. 15, 2009

(54) FOCUSING DEVICE, IMAGE PICKUP APPARATUS, AND CONTROL METHOD

(75) Inventors: Kota Terayama, Kawasaki (JP); Masaaki Uenishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 348 days.

(21) Appl. No.: 11/668,833

(22) Filed: Jan. 30, 2007

(65) Prior Publication Data
US 2007/0177862 A1   Aug. 2, 2007

(30) Foreign Application Priority Data

Feb. 2, 2006   (JP) .............................. 2006-025913
Feb. 20, 2006   (JP) .............................. 2006-042450

(51) Int. Cl.
G03B 3/10   (2006.01)
G03B 13/00   (2006.01)

(52) U.S. Cl. ........................................ 396/95; 348/345

(58) Field of Classification Search ................... 396/95, 396/103, 116, 121, 125–128; 348/345, 349, 348/352, 353, 354, 357
See application file for complete search history.

(56) References Cited

U.S. PATENT DOCUMENTS

| | | | |
|---|---|---|---|
| 4,908,645 A | 3/1990 | Higashihara et al. | |
| 5,732,288 A * | 3/1998 | Muramatsu | .................. 396/49 |
| 6,701,075 B2 | 3/2004 | Ogino | |
| 2003/0117517 A1 | 6/2003 | Ogino | |
| 2005/0185948 A1* | 8/2005 | Saito et al. | .................. 396/133 |

FOREIGN PATENT DOCUMENTS

| | | |
|---|---|---|
| EP | 1322110 | 6/2003 |
| JP | 2002-122773 | 4/2002 |

OTHER PUBLICATIONS

"NHK Gijutsu Kenkyu Hokoku", 19611965, vol. 17, No. 1, (serial No. 86), pp. 21-37).

* cited by examiner

*Primary Examiner*—W B Perkey
*Assistant Examiner*—Minh Q Phan
(74) *Attorney, Agent, or Firm*—Canon USA Inc IP Div

(57) ABSTRACT

A focusing device includes a driving unit that drives a focus lens, a control unit, and a storing unit. The control unit controls the driving unit to move the focus lens through a predetermined range, determines a state of focus based on a signal from an image pickup unit, the signal being acquired in association with movement of the focus lens through the predetermined range, and controls the driving unit so that an object's image is in focus. The storing unit stores a position of the focus lens in focus acquired by the control unit. The control unit calculates a datum point of the range of movement of the focus lens, on the basis of the position of the focus lens in the storing unit, and shifts the range of movement of the focus lens in response to the calculated datum point in a direction in which the object moves.

6 Claims, 18 Drawing Sheets

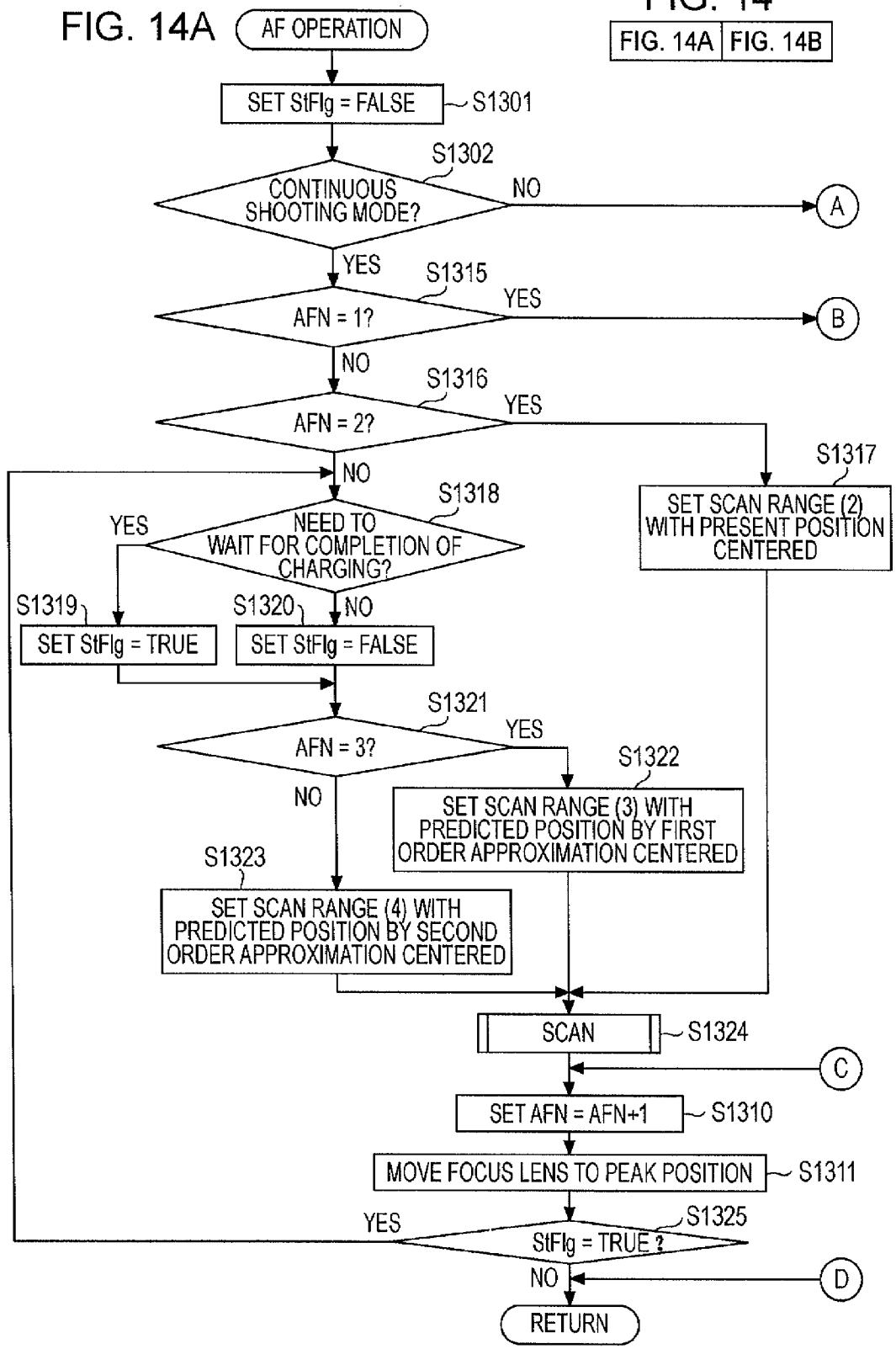

FOCUSING DEVICE, IMAGE PICKUP APPARATUS, AND CONTROL METHOD

BACKGROUND OF THE INVENTION

1. Field of the Invention

The present invention relates to a focusing technique.

2. Description of the Related Art

Electronic cameras perform focusing so that a lens's position in which a high-frequency component of a luminance signal of an image of an object formed on an image pickup element is largest is set as a focus position, at which the desired object's image is in focus. The large amount of the high-frequency component of the luminance signal of the object's image represents a high contrast of the object's image, and therefore, it represents that the image is in better focus than the case of a small amount of the high-frequency component (hereinafter, an index of a focus state is represented as a focus evaluated value). This technique is so-called contrast detection focusing (described in, for example, "NHK Gijutsu Kenkyu Hokoku", 1965, Vol. 17, No. 1, (serial No. 86), pp. 21-37). The contrast detection focusing may perform a scan operation, which moves a focus lens by a predetermined range and acquires a focus state in the predetermined range. In this case, the focus lens is moved to a position at which an object is in focus.

For a so-called continuous shooting operation, which has short time intervals between imaging operations, it is difficult to find a focus position because the time required for performing the scan operation is limited. In addition, because of various kinds of image processing, such as development and conversion for images successively captured, an enormous load is imposed on a system. Therefore, during a continuous shooting operation, the focusing is typically locked in the position of a focus lens at the first imaging operation.

Continuous shooting operations generally capture images of a moving object. This is a serious problem, considering the fact that an increased number of imaging operations in a continuous shooting operation can be technically practicable. Once the focusing has been locked, as described above, as the number of imaging operations is increased, an image of a moving object being out of focus will be captured.

To aim to address the problem, a technique of varying a scan range in a continuous shooting operation on the basis of the direction of movement of a previous focus position is described in, for example, Japanese Patent Laid-Open No. 2002-122773.

This patent document discloses varying the widths in which a scan range is divided. However, when an object moves great distances, the focus position deviates from the scan range.

SUMMARY OF THE INVENTION

The present invention is directed to a focusing device that maintains a time required for acquiring a state of focus and that has an improved capability of tracking a moving object.

According to a first aspect of the present invention, a focusing device includes a focus-lens driving unit configured to drive a focus lens, a control unit configured to control the focus-lens driving unit to move the focus lens through a predetermined range, to determine a state of focus on the basis of a signal output from an image pickup unit, the signal being acquired in association with movement of the focus lens through the predetermined range, and to control the focus-lens driving unit so that an image of an object is in focus, and a storing unit configured to store a position of the focus lens in focus acquired by the control unit. The control unit is configured to calculate, on the basis of the position of the focus lens stored in the storing unit, a datum point of the range of movement of the focus lens for moving the focus lens and to shift the range of movement of the focus lens in response to the calculated datum point in a direction in which the object moves.

According to a second aspect of the present invention, a focusing device includes a driving unit configured to drive a focus lens, a control unit configured to control the driving unit to move the focus lens through a predetermined range, to determine a state of focus on the basis of a signal output from an image pickup unit, the signal being acquired in association with movement of the focus lens through the predetermined range, and to control the driving unit so that an image of an object is in focus, and an instructing unit configured to provide an instruction to perform a plurality of imaging operations. When the instruction is provided from the instructing unit, the control unit is configured to perform movement of the focus lens by the predetermined range at a predetermined speed before each of the plurality of imaging operations, to determine the state of focus, and to, before moving the focus lens at the predetermined speed, move the focus lens to a position where the state of focus is to be determined at a speed higher than the predetermined speed.

According to a third aspect of the present invention, an image pickup apparatus includes the focusing device described above and an image pickup element.

According to a fourth aspect of the present invention, a method for controlling a focusing device is provided. The focusing device includes a focus-lens driving unit configured unit to drive a focus lens, a control unit configured to control the focus-lens driving unit to move the focus lens through a predetermined range, to determine a state of focus on the basis of a signal output from an image pickup unit, the signal being acquired in association with movement of the focus lens through the predetermined range, and to control the focus-lens driving unit so that an image of an object is in focus, and a storing unit configured to store a position of the focus lens in focus acquired by the control unit. The method includes calculating a datum point of the range of movement of the focus lens for moving the focus lens, on the basis of the position of the focus lens stored in the storing unit and shifting the range of movement of the focus lens in response to the calculated datum point in a direction in which the object moves.

According to a fifth aspect of the present invention, a method for controlling a focusing device is provided. The focusing device includes a driving unit configured to drive a focus lens, a control unit configured to control the driving unit to move the focus lens through a predetermined range, to determine a state of focus on the basis of a signal output from an image pickup unit, the signal being acquired in association with movement of the focus lens through the predetermined range, and to control the driving unit so that an image of an object is in focus, and an instructing unit configured to provide an instruction to perform a plurality of imaging operations. When the instruction is provided from the instructing unit, the method includes moving the focus lens by the predetermined range at a predetermined speed before each of the plurality of imaging operations and determining the state of focus and moving the focus lens to a position where the state of focus is to be determined at a speed higher than the predetermined speed before moving the focus lens at the predetermined speed.

According to a sixth aspect of the present invention, a focusing device includes a focusing unit configured to detect a state of focus on an object on the basis of a signal output from an image pickup element while scanning in a direction of an optical axis with respect to the object by moving a focus lens and to adjust a position of the focus lens in response to a detected result of the state of focus on the object so that the object is in focus and a control unit configured to control, in a continuous shooting operation, the focusing unit to perform a scan operation for a current imaging operation by moving the focus lens on the basis of a position of the focus lens at an imaging operation prior to the current imaging and to perform focusing. The control unit is configured to adjust, in the case where a time interval between an immediately preceding imaging operation and the current imaging operation in the continuous shooting operation is longer than each of time intervals between continuous imaging operations up to the immediately preceding imaging operation, the position of the focus lens on the basis of the scan operation a plurality of times in an interval between the immediately preceding imaging operation and the current imaging operation.

According to a seventh aspect of the present invention, a focusing device includes a focusing unit configured to detect a state of focus on an object on the basis of a signal output from an image pickup element while scanning in a direction of an optical axis with respect to the object by moving a focus lens and to adjust a position of the focus lens in response to a detected result of the state of focus on the object so that the object is in focus and a control unit configured to control, in a continuous shooting operation, the focusing unit to perform a scan operation for a current imaging operation by moving the focus lens on the basis of a position of the focus lens at an imaging operation prior to the current imaging and to perform focusing. The control unit is configured to adjust, in the case where a time interval between an immediately preceding imaging operation and the current imaging operation in the continuous shooting operation is longer than each of time intervals between continuous imaging operations up to the immediately preceding imaging operation, the position of the focus lens on the basis of the scan operation just before the current imaging operation.

According to an eighth aspect of the present invention, an image pickup apparatus includes the focusing device described above.

Further features of the present invention will become apparent from the following description of exemplary embodiments with reference to the attached drawings.

BRIEF DESCRIPTION OF THE DRAWINGS

FIGS. 14A and 14B are flowcharts of a subroutine for an AF operation according to the second exemplary embodiment.

DESCRIPTION OF THE EMBODIMENTS

Exemplary embodiments of the present invention are described below with reference to the accompanying drawings.

First Exemplary Embodiment

Figure 1:
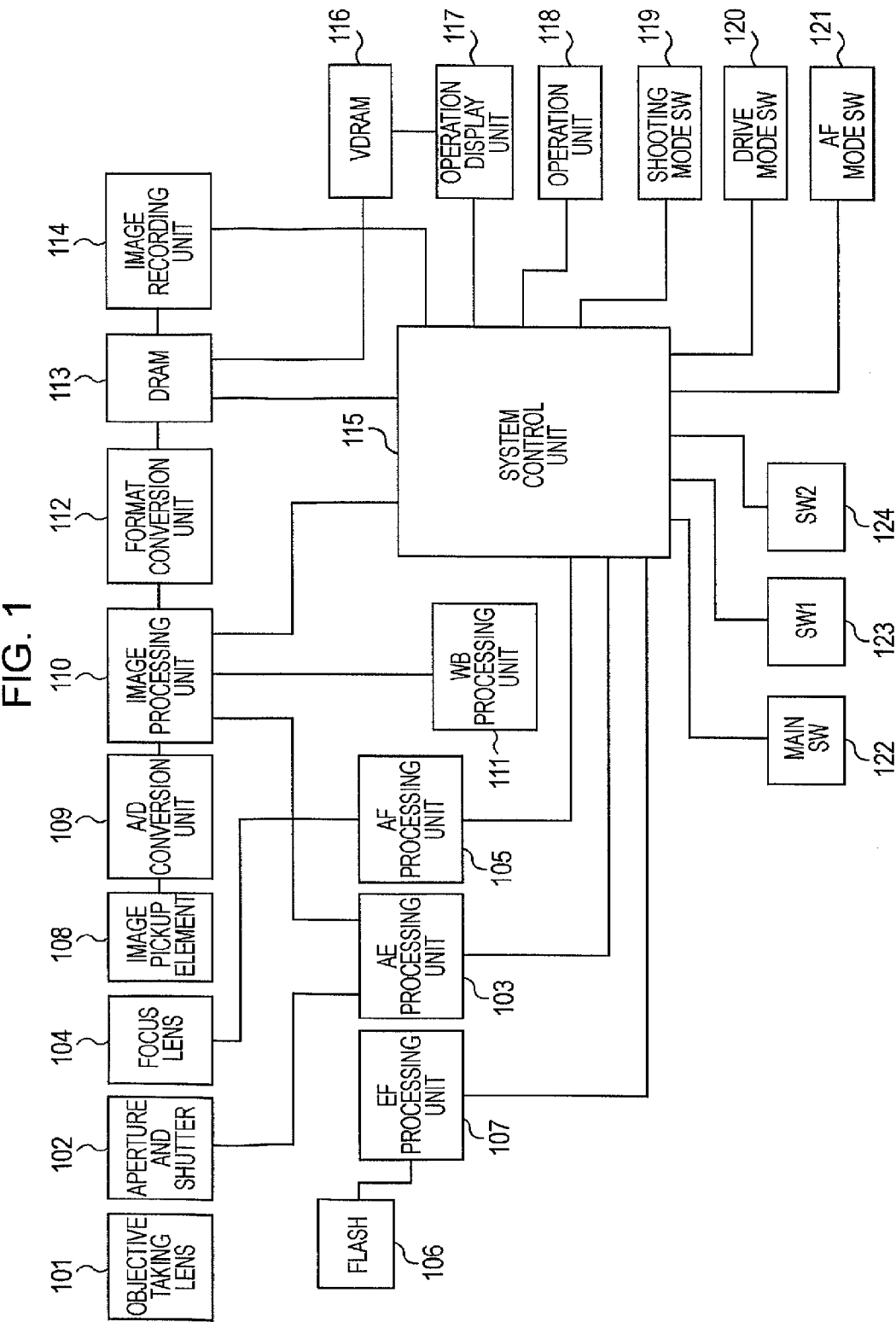
FIG. 1 is a block diagram of an electronic camera according to a first exemplary embodiment.

FIG. 1 is a block diagram of a main portion of an electronic camera to which the first exemplary embodiment is applied.

The electronic camera includes an objective taking lens 101 having a zoom mechanism, an aperture and shutter 102 for controlling the amount of light, an autoexposure (AE) processing unit 103, a focus lens 104 serving as a focusing optical system for adjusting a focal point on an image pickup element 108, an autofocus (AF) processing unit 105, a flash 106, a flash pre-emission (EF) processing unit 107, and the image pickup element 108 serving as a light detecting unit or a photoelectric conversion unit for converting light reflected from an object into an electric signal. The AF processing unit 105 will be described below in further detail with reference to FIG. 4.

The electronic camera further includes an A/D conversion unit 109, an image processing unit 110, a white balance (WB) processing unit 111, a format conversion unit 112, a high-speed internal memory 113 (e.g., random-access memory, hereinafter sometimes referred to as DRAM), an image recording unit 114 including a storage medium (e.g., a memory card) and its interface, a system control unit 115 for controlling a system, such as an imaging sequence, a memory 116 used for displaying an image (hereinafter sometimes referred to as VDRAM), an operation display unit 117, an operation unit 118 used for externally operating the camera, a shooting mode switch 119 used for selecting a shooting mode (e.g., program, landscape, portrait, high-speed shutter, and other modes), and a drive mode switch 120 used for selecting a drive mode (e.g., single shot, burst shot (continuous), self-time, and other modes). The continuous shooting mode is a mode of repeating image recording while an imaging switch 124 (hereinafter referred to as SW2), which will be described below, is pressed and held. The A/D conversion unit 109 includes a correlated double sampling (CDS) circuit for reducing noise output from the image pickup element 108 and a nonlinear amplification circuit performed prior to A/D conversion. The operation display unit 117 displays an image, an auxiliary operation, and a state of the camera and, during an imaging operation, functions as an imaging screen and displays a distance-measured area.

The electronic camera further includes an AF mode switch 121, a main switch 122 used for turning on the power to the system, a switch 123 used for performing an imaging standby operation, such as AF and AE, (hereinafter referred to as SW1), and the SW2 used for performing an imaging operation after the SW1 is operated. The AF mode switch 121 is used for selecting a continuous AF mode, which continues focusing on an object without the SW1 being pushed, or a single AF mode, which focuses after a scan operation and then maintains the position of a focus lens.

The DRAM 113 is used as a high-speed buffer as a temporary image storing unit or used as a work memory in image compression and decompression. The operation unit 118 may include, for example, a menu switch used for performing various settings, such as a setting for functions for shooting in an image pick up apparatus and a setting for image reproduction, a zoom lever used for providing instructions as to a zoom operation of the objective taking lens, and an operation-mode selection switch used for selecting the shooting mode or a reproducing mode.

An operational flow of the above electronic camera is described below with reference to FIG. 2. The operation of the operational flow is based on control processing performed by the system control unit 115 unless otherwise specified.

In step S201, the state of the main switch 122 is detected. If the state is ON, the processing proceeds to step S202. The main switch 122 functions to turn on the power to the system. In step S202, the remaining capacity of the image recording unit 114 is checked. If the remaining capacity is zero, the processing proceeds to step S203; otherwise the processing proceeds to step S204. In step S203, a warning that the remaining capacity of the image recording unit 114 is zero is issued, and then the processing returns to step S201. The warning can be displayed on the operation display unit 117 or can be output as a warning beep emitted from an audio output unit (not shown). Alternatively, both indications can be performed as the warning.

In step S204, it is detected whether the AF mode is the continuous AF mode or the single AF mode. If the continuous AF mode is detected, the processing proceeds to step S205. If the single AF mode is detected, the processing proceeds to step S206. In step S205, the continuous AF is performed in accordance with a flowchart of FIG. 3, which will be described below.

In step S206, the state of the SW1 is checked. If the detected state is ON, the processing proceeds to step S208; otherwise the processing proceeds to step S207. The SW1 functions to perform the imaging standby operation (e.g., AF and AE operation). In step S207, the state of the main switch 122 is checked. If the detected state is ON, the processing proceeds to step S204; otherwise the processing proceeds to step S201. In step S208, the AE processing unit 103 performs the AE processing in response to the output from the image processing unit 110.

In step S209, the AF operation is performed in accordance with a flowchart of FIG. 4, which will be described below. In step S210, the state of the SW2 is checked. If the detected state is ON, the processing proceeds to step S212; otherwise the processing proceeds to step S211. The SW2 functions to perform imaging after the SW1 is operated. In step S211, the state of SW1 is checked. If the detected state is not ON, the processing returns to step S204; if the detected state is ON, the processing returns to step S210, in which focus is locked until the SW2 is turned on or until the SW1 is turned off. In step S212, the shooting operation is performed in accordance with a flowchart of FIG. 11, which will be described below. In step S213, the remaining capacity of the image recording unit 114 is checked. If the detected remaining capacity is zero, the processing proceeds to step S203; otherwise the processing proceeds to step S214.

In step S214, it is checked whether the continuous shooting mode has been set (by selection via the drive mode switch 120 or as default selected via the shooting mode switch 119). If the continuous shooting mode has been set, the processing proceeds to step S216; otherwise the processing proceeds to step S215. In step S215, a captured image is displayed on the operation display unit 117 while the SW2 is in the ON state. If, in step S215, the SW2 is in the OFF state, the processing proceeds to step S211. In step S216, if the SW2 is not in the ON state, the processing proceeds to step S211. If, in step S216, the SW2 is in the ON state, the processing returns to step S209 to perform a continuous shooting operation and proceeds to the AF operation in the continuous shooting mode in accordance with the flowchart of FIG. 4.

Figure 2:
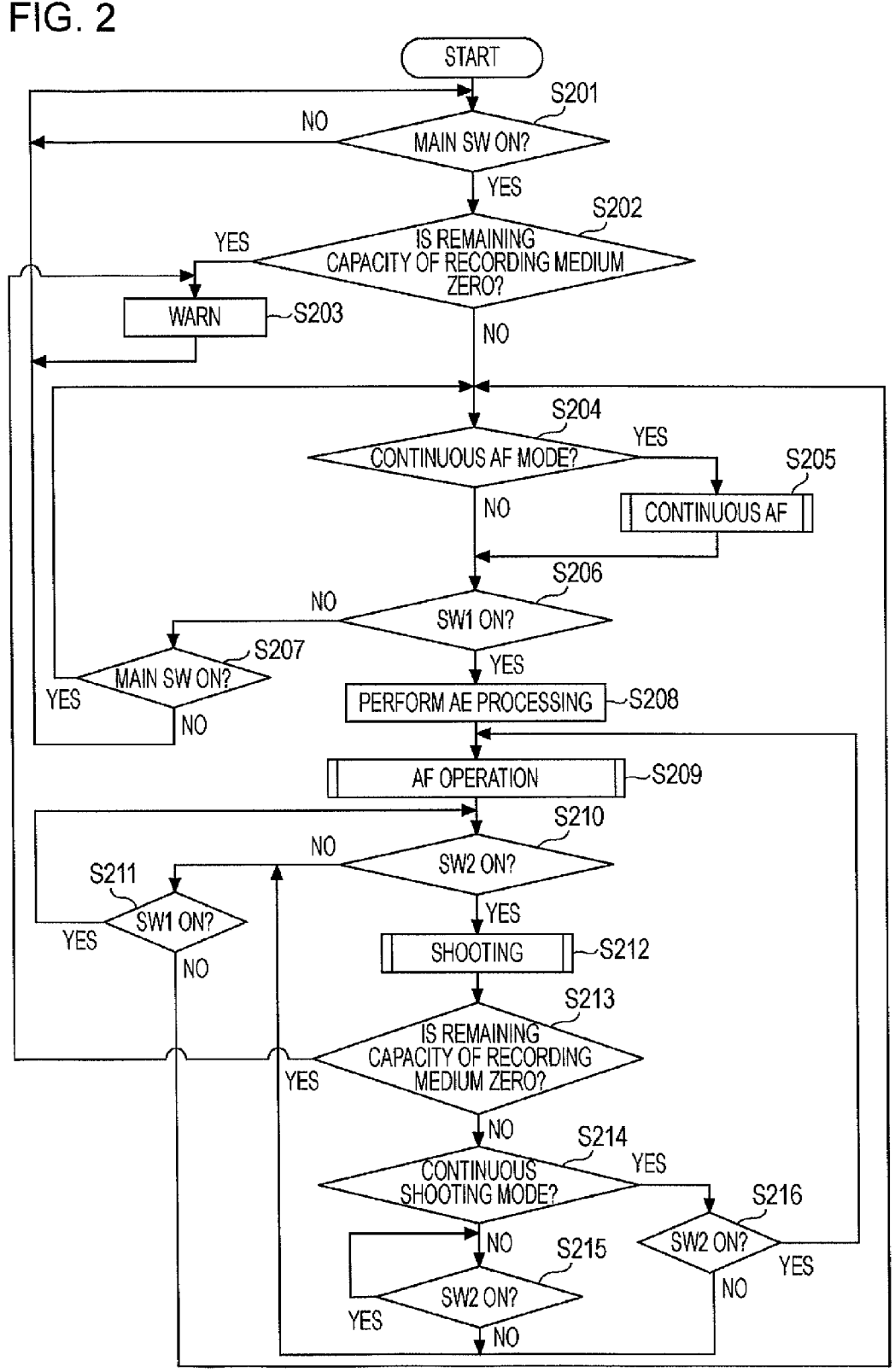
FIG. 2 is a flowchart for an operation of the electronic camera according to the first exemplary embodiment.
Figure 3:
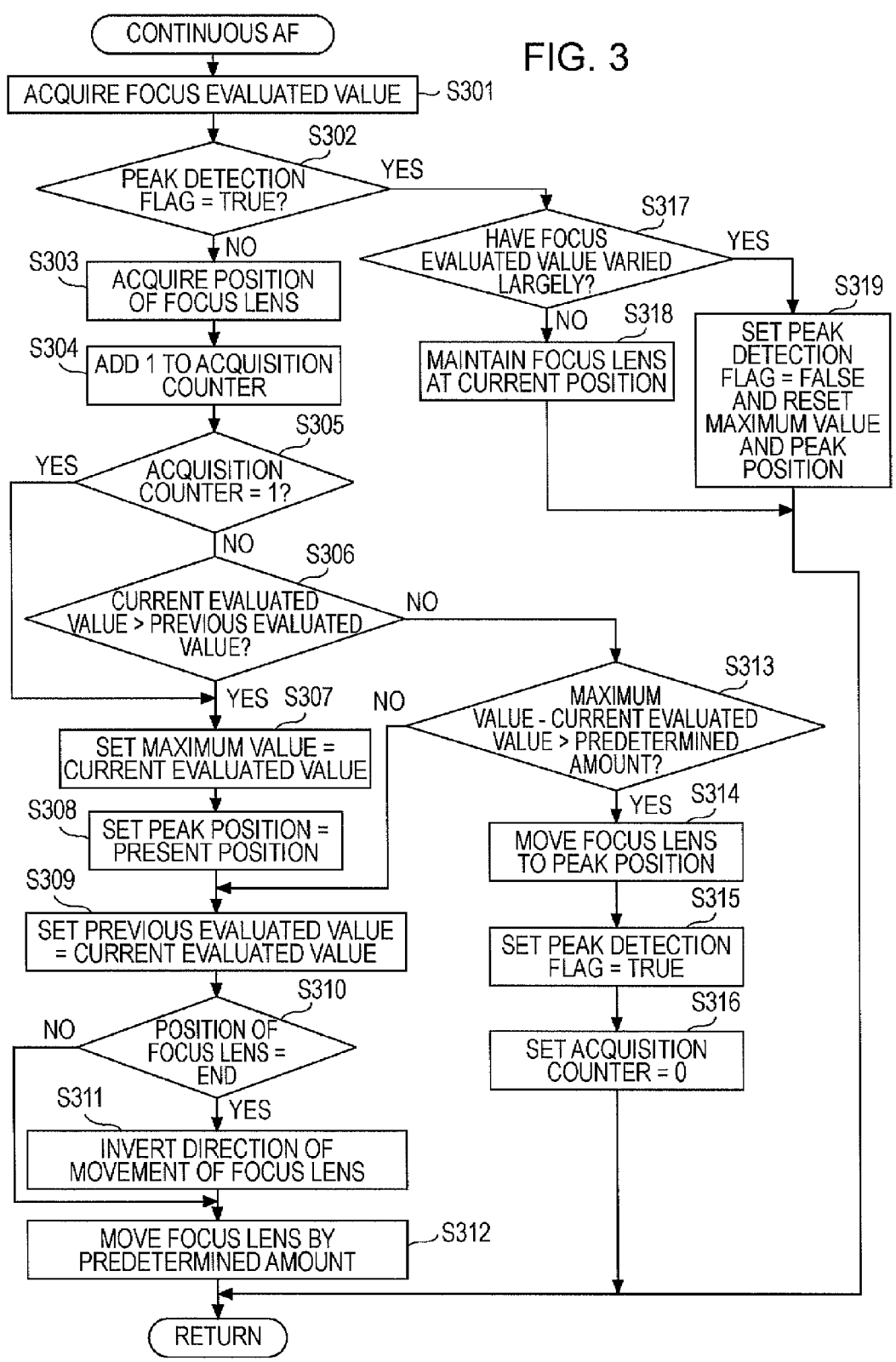
FIG. 3 is a flowchart of a subroutine for a continuous AF (step S205) shown in FIG. 2.

A subroutine for the continuous AF in step S205 in the flowchart of FIG. 2 is described below with reference to the flowchart of FIG. 3. FIG. 3 is a flowchart of a subroutine for the continuous AF in the flowchart of FIG. 2 (step S205). The subroutine is performed by the AF processing unit 105 on the basis of control processing of the system control unit 115.

In step S301, as a result of processing of the AF processing unit 105, a focus evaluated value is acquired. In step S302, the system control unit 115 determines whether a peak detection flag is TRUE. If the peak detection flag is TRUE, the processing proceeds to step S317; if not, the processing proceeds to step S303. In step S303, the present position of the focus lens 104 is acquired. In step S304, one (1) is added to an acquisition counter used for counting acquisitions of the focus evaluated value and the present position. The acquisition counter is set at zero (0) in advance by initialization (not shown). In step S305, it is checked whether the value of the acquisition counter is one. If the value is one, the processing proceeds to step S307; if the value is not one, the processing proceeds to step S306.

In step S306, it is checked whether "the current focus evaluated value" is larger than "the previous focus evaluated value". If "the current focus evaluated value" is larger than "the previous focus evaluated value", the processing proceeds to step S307; otherwise the processing proceeds to step S313. In step S307, the current focus evaluated value is stored in a calculation memory (not shown) incorporated in the system control unit 115 as the maximum value of the focus evaluated value. In step S308, the present position of the focus lens 104 is stored in the calculation memory (not shown) incorporated in the system control unit 115 as the peak position of the focus evaluated value. In step S309, the current focus evaluated value is stored in the calculation memory (not shown) incorporated in the system control unit 115 as the previous focus evaluated value. In step S310, it is checked whether the present position of the focus lens 104 lies at the end of a measured scan range. If the present position of the focus lens 104 lies at the end of the scan range, the processing proceeds to step S311; otherwise the processing proceeds to step S312. In step S311, the direction of movement of the focus lens 104 is inverted. In step S312, a signal for moving the focus lens 104 by a predetermined amount is output.

In step S313, it is checked whether a value of "the maximum value of the focus evaluated value—the current focus evaluated value" is larger than a predetermined amount. If the value of "the maximum value of the focus evaluated value—the current focus evaluated value" is larger than the predetermined amount, the processing proceeds to step S314; otherwise the processing proceeds to step S309. If the value of "the maximum value of the focus evaluated value—the current focus evaluated value" is larger than the predetermined amount, i.e., the current focus evaluated value decreases from the maximum value by the predetermined amount or more, the peak position corresponding to the maximum value is considered as a focus position. In step S314, the focus lens 104 is moved to the peak position corresponding to the maximum value of the focus evaluated value stored in step S308. In step S315, the peak detection flag is set at TRUE. In step S316, the acquisition counter is set at zero.

In step S317, the system control unit 115 checks whether the current focus evaluated value has varied from the maximum value of the focus evaluated value by a predetermined ratio or more. If the current focus evaluated value has greatly varied by the predetermined ratio or more, the processing proceeds to step S319; if the current focus evaluated value has varied by a little, the processing proceeds to step S318. In step S318, the focus lens 104 is maintained at the current position. In step S319, in order to recalculate the position of the focus lens 104 where the focus evaluated value is highest, the peak detection flag is set at FALSE, and the maximum value of the focus evaluated value and the peak position corresponding thereto are reset.

As described above, the continuous AF operation drives the focus lens 104 so that the focus lens 104 is continuously in focus.

A subroutine for the AF operation in step S209 in the flowchart of FIG. 2 is described below with reference to FIGS. 4 and 5. FIG. 4 is a flowchart of a subroutine for the AF operation in the flowchart of FIG. 2 (step S209). The subroutine is performed on the basis of the control processing of the system control unit 115. FIG. 5 illustrates a method for setting a scan range. In FIG. 5, the horizontal axis represents the number of imaging times, and the vertical axis represents the position of the focus lens.

In step S401, it is checked whether the continuous shooting mode has been set (by selection via the drive mode switch 120 or as default selected via the shooting mode switch 119). If the continuous shooting mode has been set, the processing proceeds to step S412; otherwise the processing proceeds to step S402.

In step S402, it is checked whether the AF mode selected by the AF mode switch 121 is the continuous AF mode or the single AF mode. If the detected AF mode is the continuous AF mode, the processing proceeds to step S403; if not, the processing proceeds to step S405. In step S403, it is checked whether the peak detection flag in the flowchart of FIG. 3 is TRUE. If the peak detection flag is TRUE, the processing proceeds to step S404; if not, the processing proceeds to step S405.

In step S404, with the main aim of improving the accuracy of focusing, a scan range that has a predetermined narrow scan width centered about the present position of the focus lens is set. This is because, due to the continuous AF operation, the focus lens lies adjacent to the focus position, at which the focus evaluated value is highest.

The scan range is set in step S404 so as to satisfy the number of scan data required for the focus determination performed in accordance with a flowchart of FIG. 7, which will be described below, and so as not to have an unnecessary long length of a scan time. The speed of the focus lens during scanning may vary from one scan to another. For example, a scan operation in a side adjacent to a closest point can have a higher speed of the focus lens because the image plane velocity is higher at the side adjacent to the closest point.

In step S405, all scannable area corresponding to a selected mode is set as the scan range.

In step S406, a scan operation over the scan range set in step S404 or S405 is performed in accordance with a flowchart of FIG. 6, which will be described below. In step S407, the focus determination is performed in accordance with a flowchart of FIG. 7, which will be described below, in response to the focus state acquired in step S406.

In step S408, if the result of the focus determination in step S407 is "○", the processing proceeds to step S409; if the result is "x", the processing proceeds to step S410. The details of the results "○" and "x" will be described below. In step S410, it is checked whether scanning of all scannable area in a selected mode has been completed. If the scanning has been completed, the processing proceeds to step S411; if the scanning has not been completed, the processing returns to step S405. In step S409, the focus lens 104 is moved to a peak position calculated in the scan operation in step S406 or in step S418, which will be described below. In step S411, the focus lens 104 is moved to a preset position called a fixed point.

The above-described AF operation corresponds to an AF operation that is performed when the continuous shooting mode is not selected and varies the settings of the scan range depending on the selected AF mode (continuous AF mode or single AF mode). Next, an AF operation performed when the continuous shooting mode is selected is described below.

In step S412, the system control unit 115 checks whether the current imaging operation is a first one in a continuous shooting operation. If the current imaging operation is the first one, the processing proceeds to step S403; otherwise the processing proceeds to step S413. In the case of the first imaging operation in the continuous shooting operation, the AF operation is the same as in the continuous AF. This intends to reduce a release time lag by setting a narrower scan range in step S404 than that set via step S405.

In step S413, the system control unit 115 checks whether the current imaging operation is a second one in the continuous shooting operation. If the current imaging operation is the second one, the processing proceeds to step S414; otherwise the processing proceeds to step S415. In step S414, the position of the focus lens 104 in the first imaging operation (peak position "FP1") is set as a center position "ObjP2" as a datum point of the scan range. The scan range is set so that not increasing the time intervals between continuous imaging operations is prioritized. The scan range is set so that the AF operation is completed in an interval between continuous imaging operations in consideration of the time required for performing processing within the time interval between the continuous imaging operations, for example, the time required for reading an image signal from the image pickup element and the time required for checking the next imaging operation.

In step S415, the system control unit 115 checks whether the current imaging operation is a third one in the continuous shooting operation. If the current imaging operation is the third one, the processing proceeds to step S416; otherwise the processing proceeds to step S417. In step S416, since information on two focus positions (peak positions FP1 and FP2) for the first and second imaging operations in the continuous shooting operation as focus-position historical information exists, assuming that the time interval between continuous imaging operations is constant, a center position "ObjP3" as a datum point of the scan range is calculated by prediction of an object distance (prediction of a peak position for the third imaging operation) by a first order approximation represented by expression (1):

$$ObjP3 = FP2 + (FP2 - FP1) \times FpAdj3 \qquad (1)$$

The parameter FpAdj(n) is a parameter for assigning weights to the result of the prediction of the object distance and the immediately preceding focus position and takes on values from 0 to 1. For the position of the focus position shown in FIG. 5, FpAdj(n) is one (1). The scan range is set on the basis of the calculated center position ObjP3, so that the scan range is shifted from the previous scan range toward a direction in which an object's image moves.

In step S417, since information on at least three focus positions as the focus-position historical information exists, assuming that the time interval between continuous imaging operations is constant, a center position "ObjP4" as a datum point of the scan range is calculated by prediction of an object distance (peak position for the current imaging operation) by a second order approximation represented by expression (2):

$$ObjP4=(FP1-3FP2+3FP3) \times FpAdj4+FP3(1-Fp Adj4)=(FP1-3FP2+2FP3) \times FpAdj4+FP3 \quad (2)$$

The scan range is set on the basis of the calculated center position ObjP4, so that the scan range is shifted from the previous scan range toward a direction in which an object's image moves. Similarly, for the fifth and subsequent continuous imaging operations, each of the respective center positions ObjP(n) as a datum point of each of the respective scan ranges is calculated by prediction of an object distance (peak position for the current imaging operation) by a second order approximation represented by expression (3):

$$ObjP(n)=(FP(n-1)-3FP(n-2)+2FP(n)) \times FpAdj(n)+FP(n-1) \quad (3)$$

The scan range is set on the basis of the calculated center position ObjP(n), so that the scan range is shifted from the previous scan range toward a direction in which an object's image moves. In step S418, scan is performed in accordance with the flowchart of FIG. 6, which will be described below. In step S409, the focus lens 104 is moved to the peak position (this may be a peak position for the previous imaging operation).

For the second and subsequent continuous imaging operations, the focus determination in step S407 is not performed. This is because, even if the result of the focus determination in the flowchart of FIG. 7 is "x", an imaging operation performed at the peak position for the previous imaging operation is more likely to have reduced blurring than an imaging operation performed after the focus lens 104 is driven to a fixed point.

In the foregoing description about the first exemplary embodiment, for the first imaging operation (YES in step S412), the processing shifts to a mode that is the same as the continuous AF mode. Alternatively, the center position for the first imaging operation can be calculated by performing the following processing in the continuous shooting mode. That is, it is set in advance that, in the case where the continuous shooting mode has been set, in step S204 in FIG. 2, the processing shifts to the continuous AF mode. In this case, the center position can be predicted from the first imaging operation in the continuous shooting operation by calculation based on information on the previous focused focal point before the SW1.

A subroutine for a scan operation shown in the flowchart of FIG. 4 (steps S406 and S418) is described below with reference to the flowchart of FIG. 6. FIG. 6 is a flowchart of a subroutine for the scan operation in the flowchart of FIG. 4 (steps S406 and S418). The subroutine is performed on the basis of the control processing of the system control unit 115.

In step S601, the focus lens 104 is moved to a scan start position at a speed that is higher than a speed during scan operation.

In the first exemplary embodiment, the scan start position is set at a first end of a set scan range. Unlike the first exemplary embodiment, the scan start position can be a point other than the end of the scan range. In this case, however, the scan operation may require a longer time accordingly. In step S602, a focus evaluated value for an area corresponding to an AF frame set in an imaging region and the position of the focus lens 104 are stored in a calculation memory (not shown) incorporated in the system. In step S603, it is checked whether the position of the focus lens 104 is a scan end position. If the position of the focus lens 104 is the scan end position, the processing proceeds to step S605; otherwise the processing proceeds to step S604. The scan end position is set at a second end of the set scan range. In step S604, the focus lens 104 is driven and moved in a predetermined direction by a predetermined amount. In step S605, on the basis of the focus evaluated value and the position of the focus lens 104 stored in step S602, a peak position of the focus lens 104 that corresponds to the maximum value of the focus evaluated value is calculated.

Figure 12:
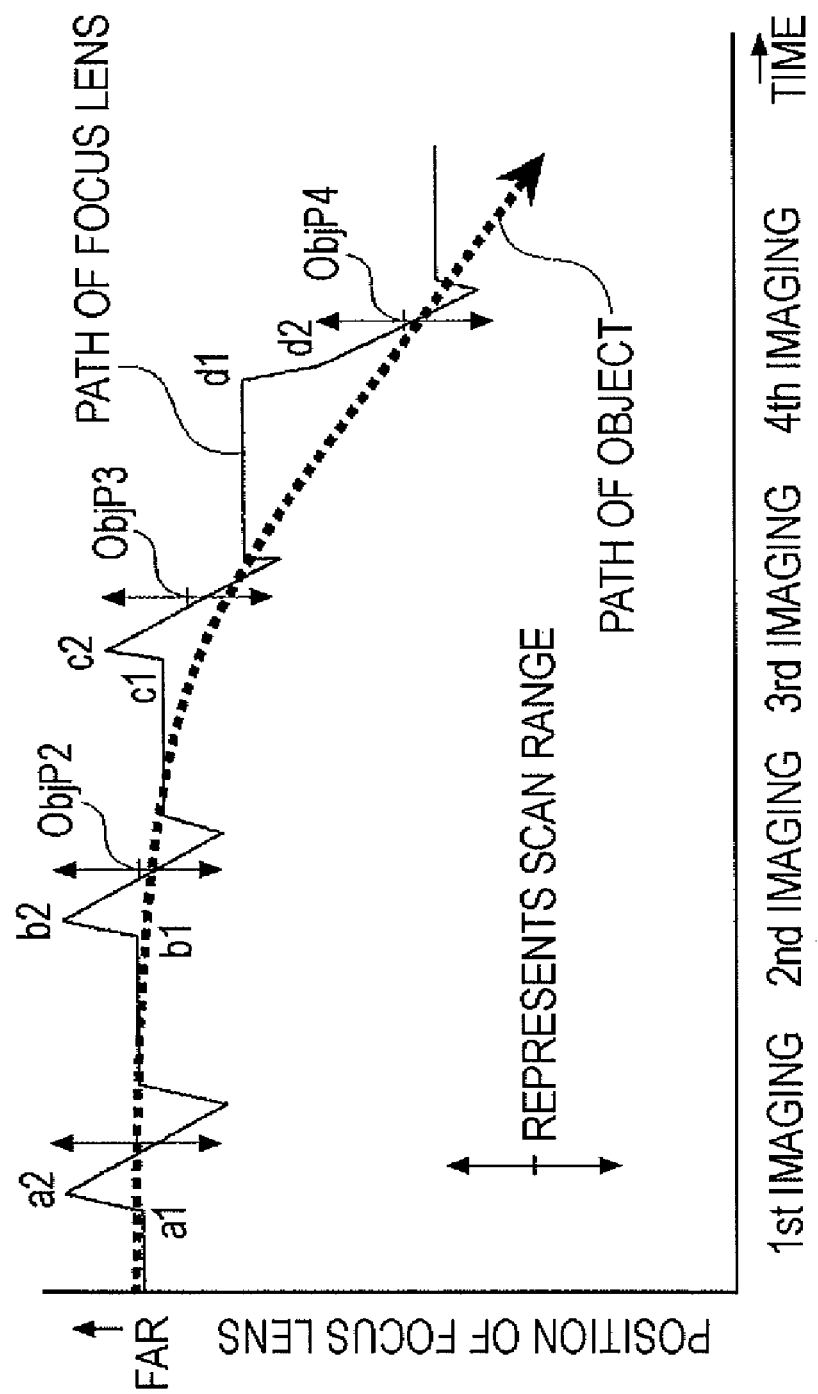
FIG. 12 illustrates how a focus lens moves according to the first exemplary embodiment.

FIG. 12 illustrates how the focus lens moves during a continuous shooting operation over time. For the first imaging operation, the system control unit 115 controls the focus lens so that the focus lens moves from a present position a1 thereof to a scan start position a2 at a speed that is higher than a speed during scan operation. Then, the scan operation starts from the scan start position a2. The focus lens stops at the peak position FP1. For the second imaging operation, the system control unit 115 controls the focus lens so that the focus lens moves from a present position b1 thereof as being the peak position FP1 to a scan start position b2 at a speed that is higher than a speed during the scan operation. Moreover, the focus lens is moved from a present position c1 thereof as being the peak position FP2 for the second imaging operation to a scan start position c2 calculated by the above-described manner at high speed.

Similarly, the focus lens is moved from a position d1 to a position d2 at a speed that is higher than a speed during the subsequent scan operation. Therefore, a sufficient scan range can be maintained and, even when an object distance largely varies, focusing can track an object with high precision.

A subroutine for the focus determination shown in the flowchart of FIG. 4 (step S407) is described below with reference to FIGS. 7 to 10.

Figure 10:
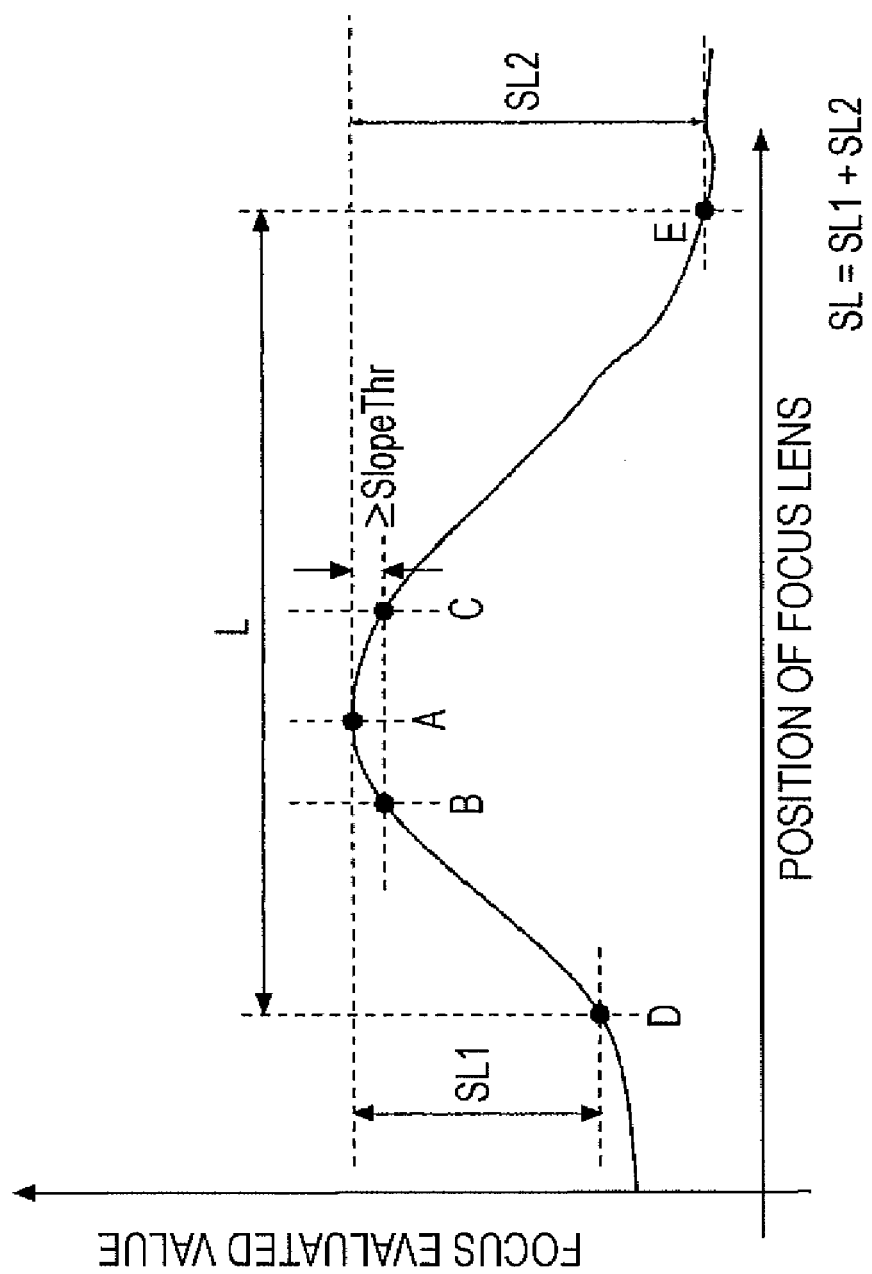
FIG. 10 is an illustration for describing a concept of determination of a focus evaluated value.

FIG. 10 illustrates a hill-shaped focus state, with the horizontal axis representing the position of the focus lens and the vertical axis representing the focus evaluated value. It is determined whether the focus evaluated value exhibits a hill-shaped state like this, on the basis of the difference between the maximum value and the minimum value of the focus evaluated value, the length of a segment that is inclined at a slope of a constant value (SlopeThr) or more, and the slope of the inclined segment. The focus determination is performed by this processing. The result of the focus determination is output as "○" or "x", which will be described below.

The mark "○" represents that an object can be focused from a position corresponding to the peak position of the focus evaluated value. The mark "x" represents that the contrast of an object is insufficient or that an object lies in an area other than a scanned range.

As shown in FIG. 10, points to which the inclination from the top of a hill (point A) continues are defined as points D and E, the distance between the points D and E is defined as the width of the hill L, the difference between the focus evaluated values at the points A and D is defined as SL1, the difference between the focus evaluated values at the points A and E is defined as SL2, and the sum of SL1 and SL2 is defined as SL.

Figure 4:
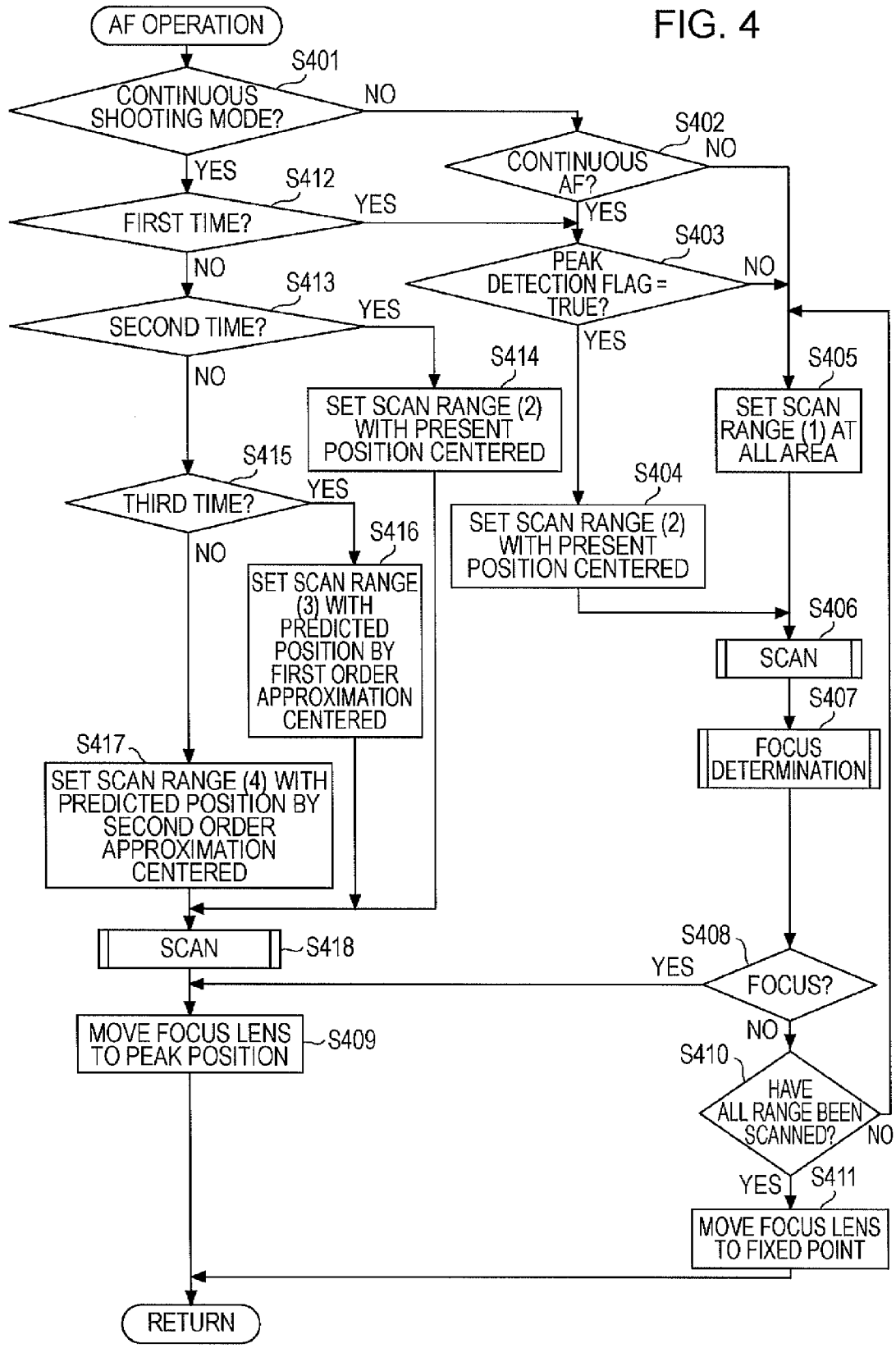
FIG. 4 is a flowchart of a subroutine for an AF operation (step S209) shown in FIG. 2.
Figure 5:
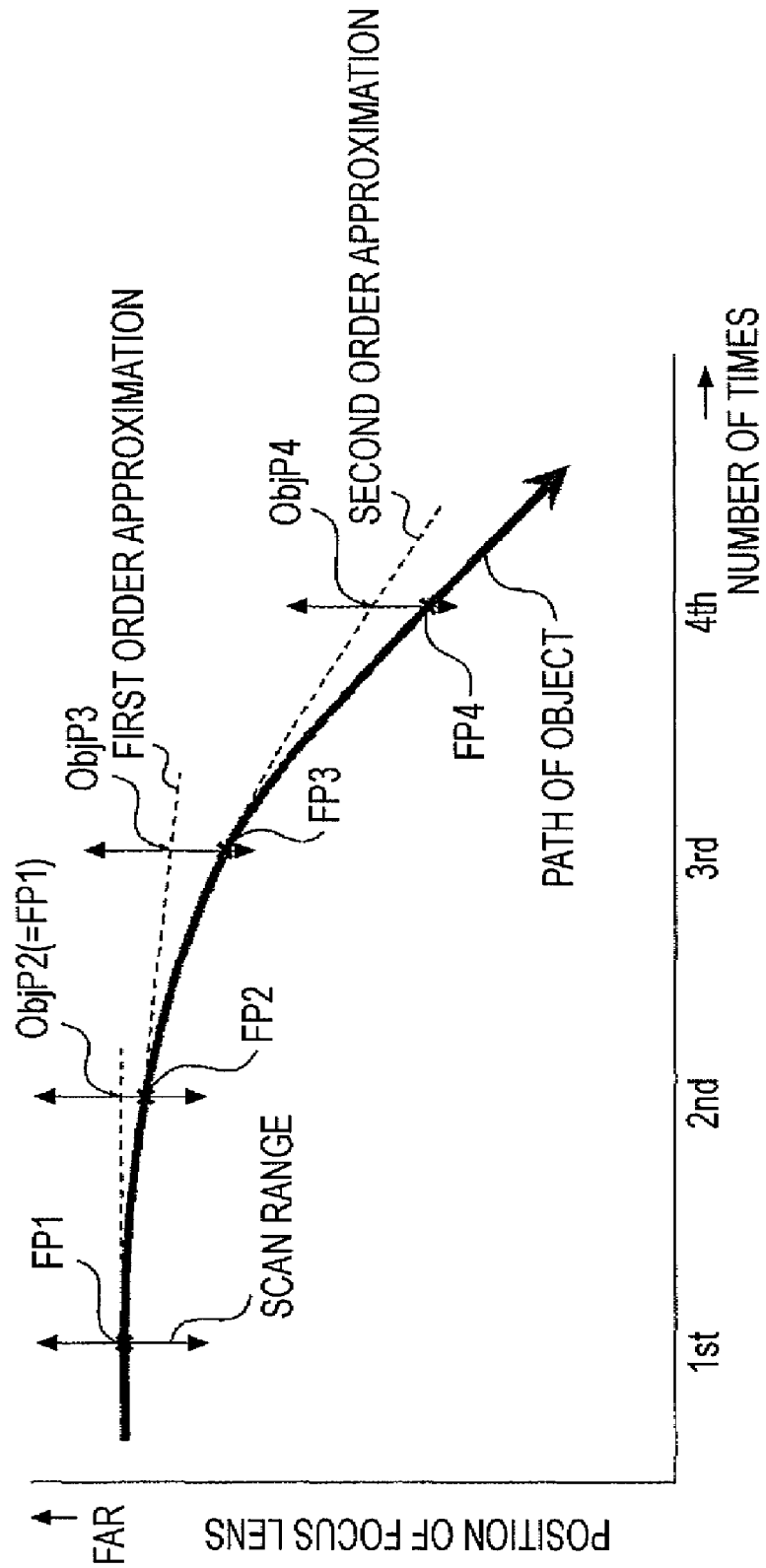
FIG. 5 illustrates a method for setting a scan range in FIG. 4.
Figure 7:
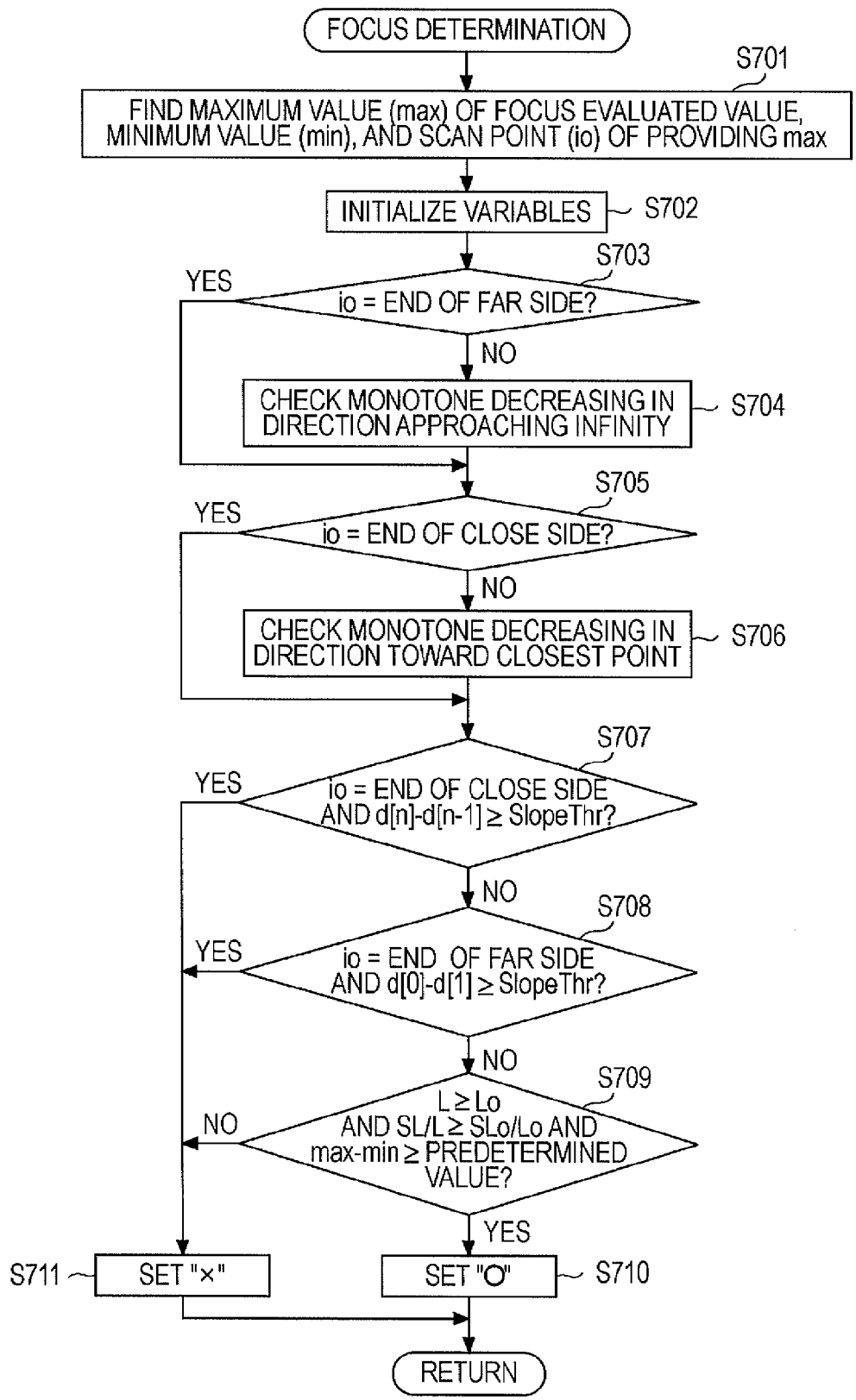
FIG. 7 is a flowchart of a subroutine for a focus determination (step S407) shown in FIG. 4.

FIG. 7 is a flowchart of a subroutine for the focus determination shown in the flowchart of FIG. 4 (step S407). The subroutine is performed on the basis of control processing of the system control unit 115.

In step S701, a maximum value, max, of a focus evaluated value, a minimum value, min, thereof, and a scan point, io, for providing the maximum value are found. Next, in step S702, a variable L, which represents the width of a hill of the focus evaluated value, and a variable SL, which represents the slope of the hill, are reset to zero. In step S703, it is checked whether the scan point io, which provides the maximum value, lies at an end adjacent infinity in a scanned predetermined range. If the scan point io does not lie at the end adjacent to infinity, the processing proceeds to step S704, in which monochrome decreasing in a direction approaching infinity is checked. If the scan point io lies at the end adjacent to infinity, the processing skips this process and proceeds to step S705.

Figure 8:
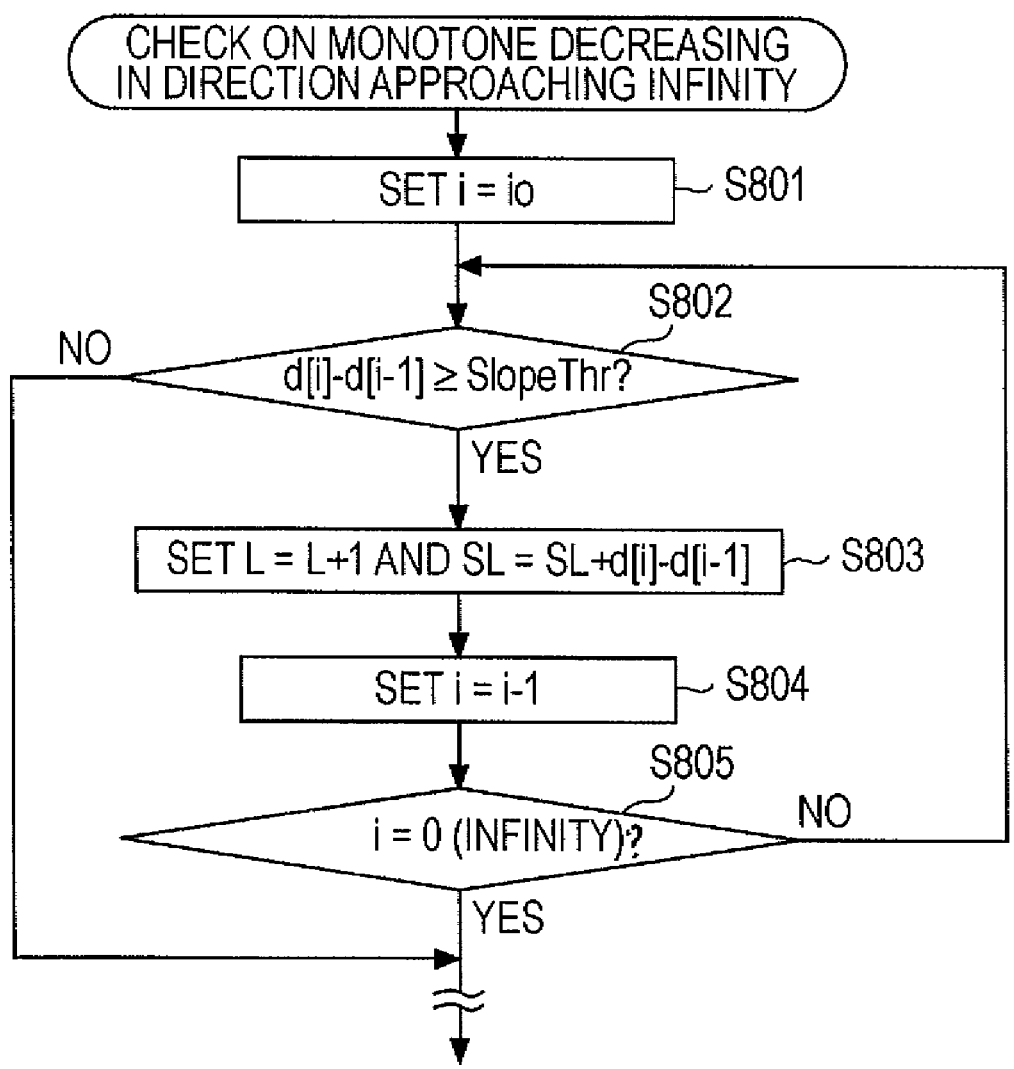
FIG. 8 is a flowchart for an operation of finding monotone decreasing in a direction approaching infinity.

Here, the process of checking monochrome decreasing in the direction approaching infinity in step S704 is described. FIG. 8 shows a flowchart of the process.

In step S801, a counter variable i is reset to io. In step S802, the difference between the value, d[i], of the focus evaluated value at the scan point i and the value, d[i−1], of the focus evaluated value at a scan point i−1, which is shifted toward infinity by one scan point, is compared with a predetermined value SlopeThr. If d[i]−d[i−1]≧SlopeThr, it is determined that monochrome decreasing in the direction approaching infinity has occurred and the processing proceeds to step S803. In step S803, the variable L, which represents the length of a segment that is inclined at a slope of a constant value or more (the width of the hill), and the variable SL, which represents the decrease in a section of the monochrome decreasing, are updated by the following expressions:

$L=L+1$ $SL=SL+(d[i]-d[i-1])$

If, in step S802, d[i]−d[i−1]<SlopeThr, it is determined that monochrome decreasing in the direction approaching infinity has not occurred, the process of checking monochrome decreasing in the direction approaching infinity is completed, and the processing proceeds to step S705.

In contrast, if the process of checking monochrome decreasing in the direction approaching infinity is to continue, the processing proceeds to step S804. In step S804, i=i−1 is set, i.e., a point to be detected is shifted toward infinity by one scan point. In step S805, it is checked whether the counter value i is a value at the end adjacent to infinity in the scanned predetermined range (=0). If the counter value i is 0, i.e., a start point for detecting monochrome decreasing reaches the end adjacent to infinity in the scanned predetermined range, the process of checking monochrome decreasing in the direction approaching infinity is completed, and the processing proceeds to step S705.

As described above, from i=io, the monochrome decreasing in the direction approaching infinity is checked.

In step S705, it is checked whether the scan point io, which provides the maximum value, lies at an end adjacent to a closest point in a scanned predetermined range. If the scan point io does not lies at the end adjacent to the closest point, the processing proceeds to step S706, in which monochrome decreasing in a direction toward the closest point is checked. If the scan point io lies at the end adjacent to the closest point, the processing skips this process and proceeds to step S707.

Figure 9:
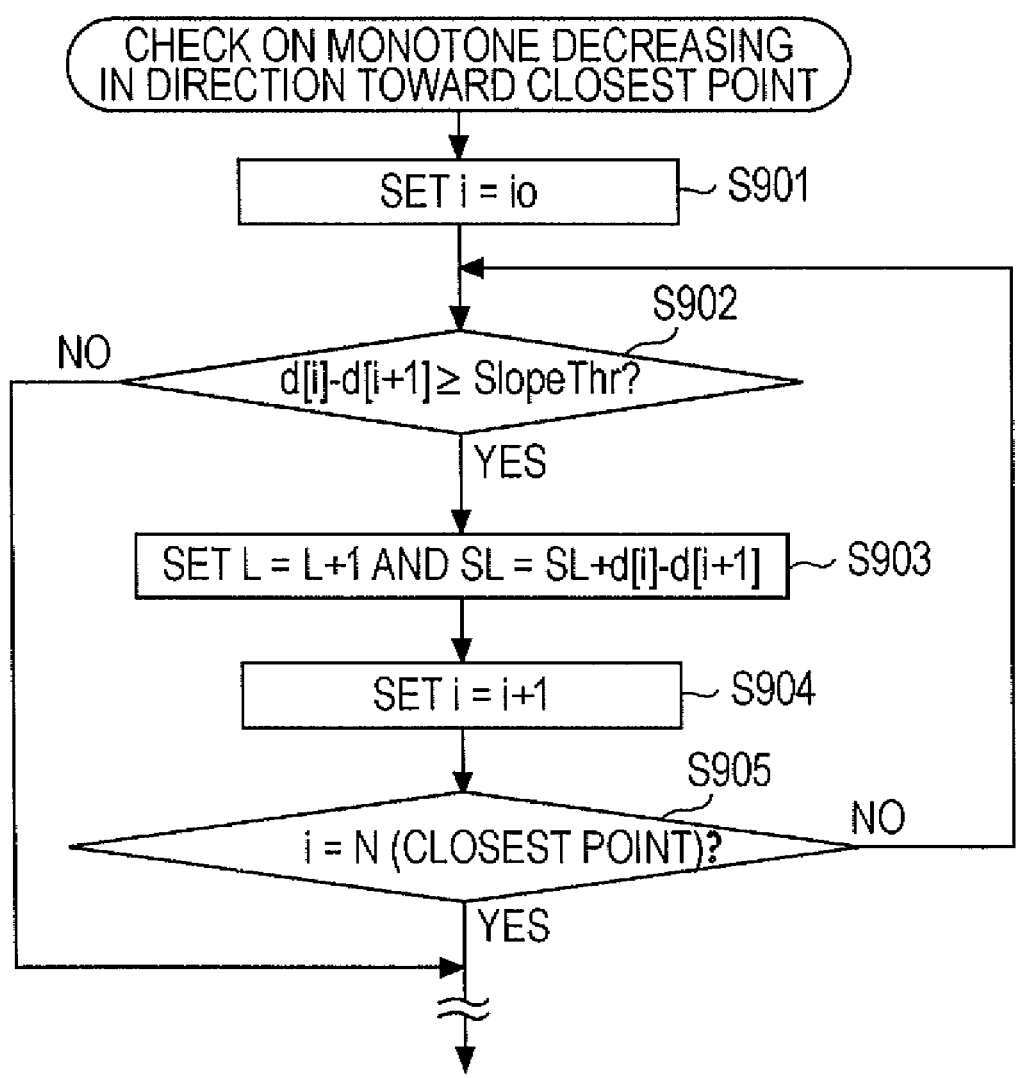
FIG. 9 is a flowchart for an operation of finding monotone decreasing in a direction toward the closest point.

Here, the process of checking monochrome decreasing in the direction toward the closest point in step S706 is described. FIG. 9 shows a flowchart of the process.

In step S901, a counter variable i is reset to io. In step S902, the difference between the value d[i] of the focus evaluated value at the scan point i and the value, d[i+1], of the focus evaluated value at a scan point i+1, which is shifted toward the closest point by one scan point, is compared with the predetermined value SlopeThr. If d[i]−d[i+1]≧SlopeThr, it is determined that monochrome decreasing in the direction toward the closest point has occurred and the processing proceeds to step S903. In step S903, the variable L, which represents the length of a segment that is inclined at a slope of a constant value or more (the width of the hill), and the variable SL, which represents the decrease in a section of the monochrome decreasing, are updated by the following expressions:

$L=L+1$ $SL=SL+(d[i]-d[i+1])$

If, in step S902, d[i]−d[i+1]<SlopeThr, it is determined that monochrome decreasing in the direction toward the closest point has not occurred, the process of checking monochrome decreasing in the direction toward the closest point is completed, and the processing proceeds to step S707.

In contrast, if the process of checking monochrome decreasing in the direction toward the closest point is to continue, the processing proceeds to step S904. In step S904, i=i+1 is set, i.e., a point to be detected is shifted toward the closest point by one scan point. In step S905, it is checked whether the counter value i is a value at the end adjacent to the closest point in the scanned predetermined range (=N). If the counter value i is N, i.e., a start point for detecting monochrome decreasing reaches the end adjacent to the closest point in the scanned predetermined range, the process of checking monochrome decreasing in the direction toward the closest point is completed, and the processing proceeds to step S707.

As described above, from i=io, the monochrome decreasing in the direction toward the closest point is checked.

When the processes of checking the monochrome decreasing in the direction approaching infinity and that in the direction toward the closest point are completed, it is checked whether an obtained focus evaluated value is hill-shaped by comparisons between various coefficients and the respective thresholds to determine "○" or "×".

In step S707, if the scan point io, which provides the maximum value of the focus evaluated value, lies at the end adjacent to the closest point in a scanned predetermined range and the difference between the value, d[n], of the focus evaluated value at a scan point n being the end adjacent to the closest point in the scan range and the value, d[n−1], of the focus evaluated value at a scan point n−1, which is shifted toward infinity by one scan point, is equal to or larger than the predetermined value SlopeThr, the processing proceeds to step S711. Otherwise the processing proceeds to step S708. In step S708, if the scan point io, which provides the maximum value of the focus evaluated value, lies at the end adjacent to infinity in a scanned predetermined range and if the difference between the value, d[0], of the focus evaluated value at a scan point 0 being the end adjacent to infinity in the scan range and the value, d[1], of the focus evaluated value at a scan point 1, which is shifted from the scan point 0 toward the closest point by one scan point, is equal to or larger than the predetermined value SlopeThr, the processing proceeds to step S711. Otherwise the processing proceeds to step S709.

In step S709, if the length L, which is the length of a segment that is inclined at a slope of a constant value or more, is equal to or larger than a predetermined value Lo, the mean value, SL/L, of the slope in the inclined segment is equal to or larger than a predetermined value SLo/Lo, and the difference between the maximum and minimum values of the focus evaluated value is equal to or larger than a predetermined value, the processing proceeds to step S710. Otherwise the processing proceeds to step S711. In step S710, since a hill-shaped focus evaluated value is acquired and thus focusing on an object is obtainable, the determination results in "○". In step S711, since an acquired focus evaluated value is not hill-shaped and thus focusing on an object is not obtainable, the determination results in "x".

As described above, the focus determination in step S407 in the flowchart of FIG. 4 is performed.

Figure 11:
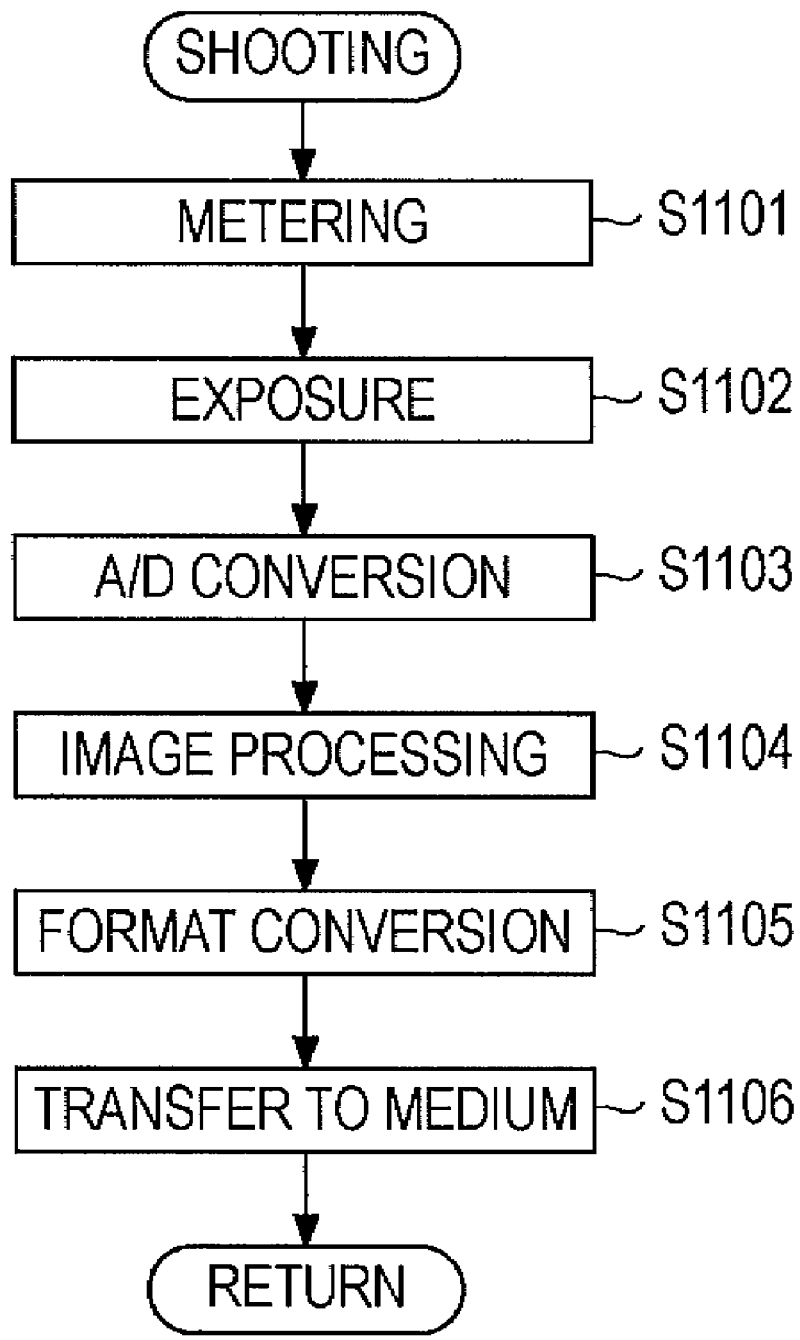
FIG. 11 is a flowchart of a subroutine for a shooting operation shown in FIGS. 2 and 13.

A subroutine for the shooting operation in step S212 in the flowchart of FIG. 2 is described with reference to the flowchart of FIG. 11. FIG. 11 is a flowchart of a subroutine for the shooting operation in the flowchart of FIG. 2 (step S212). The subroutine is performed on the basis of control processing of the system control unit 115.

In step S1101, the brightness of an object is measured. In step S1102, in response to the brightness of the object measured in step S1101, the image pickup element 108 is exposed. An image formed on the surface of the image pickup element 108 is photoelectrically converted into an analog signal. In step S1103, the analog signal is sent to the A/D conversion unit 109, and it is converted into a digital signal after being subjected to pre-processing, such as noise reduction of noise output from the image pickup element 108 and nonlinear processing. In step S1104, the white balance of a signal output from the A/D conversion unit 109 is adjusted by the WB processing unit 111, and the signal is processed so as to be a proper output image signal in the image processing unit 110. In step S1105, the format of the output image signal is converted into the JPEG format or other formats by the format conversion unit 112, and it is temporarily stored in the DRAM 113. In step S1106, data in the DRAM 113 is transferred to an external storage medium, such as a memory in the camera or a memory card mounted in the camera, and is stored therein.

Setting the scan width in a narrow range, as described above, is not limited to setting a uniform scan width. For example, if the scan center position determined by prediction of an object is remote from the immediately preceding imaging position, because the amount of movement of the object is determined to be large, it may be effective to increase the scan width within a range in which the AF operation can be completed in the time interval between continuous imaging operations. If focus is prioritized and the time interval between continuous imaging operations is allowed to be expanded, setting the scan width is not limited to the above-described setting.

In the foregoing description, the center position ObjP(n) in the scan range is calculated. However, the center position of the scan range can be replaced with any position as long as the position is a datum point for defining the scan range. For example, a position that is displaced from the center position of the scan range toward a far side by a predetermined position may be calculated. A datum point suited for calculation can be used.

In the foregoing description, the scan range may be determined from a period of time of a scanning operation and a speed of a focus lens during the scanning.

As described above, a focusing technique described in the first exemplary embodiment predicts the movement of an object on the basis of historical information on past focus positions. At this time, by calculation of the center position of a scan range, the focusing technique can have an improved capability of tracking a moving object.

Second Exemplary Embodiment

Figure 13:
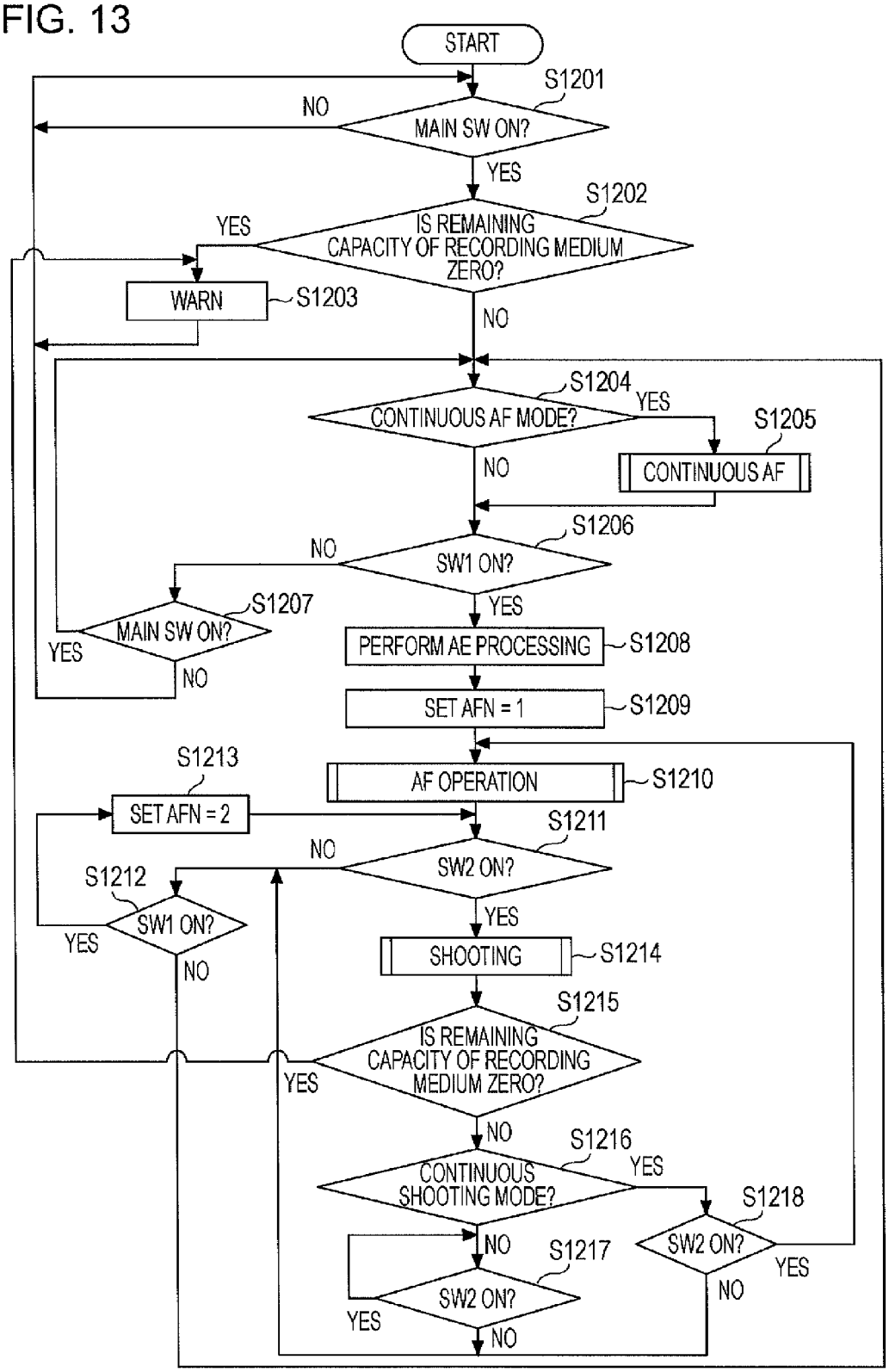
FIG. 13 is a flowchart for a series of operations according to second and third exemplary embodiments.

FIG. 13 is a flowchart for a series of operations of an electronic camera according to the second exemplary embodiment.

In step S1201, the state of the main switch 122 is detected. If the detected state is ON, the processing proceeds to step S1202. The main switch 122 functions to turn on the power to the system. In step S1202, the remaining capacity of the image recording unit 114 is checked. If the detected remaining capacity is zero, the processing proceeds to step S1203; otherwise the processing proceeds to step S1204. In step S1203, a warning that the remaining capacity of the image recording unit 114 is zero is issued, and then the processing returns to step S1201. The warning can be displayed on the operation display unit 117 or output as a warning beep emitted from an audio output unit (not shown). Alternatively, both indications can be performed as the warning.

In step S1204, as a result of determining that the remaining capacity of the image recording unit 114 is not zero in S1202, it is checked whether the AF mode is the continuous AF mode or the single AF mode. If the continuous AF mode is detected, the processing proceeds to step S1205. If the single AF mode is detected, the processing proceeds to step S1206. In step S1205, the continuous AF mode is performed in accordance with the flowchart of FIG. 3.

In next step S1206, the state of the SW1 is checked. If the detected state is ON, the processing proceeds to step S1208; otherwise the processing proceeds to step S1207. The SW1 functions to perform the imaging standby operation (e.g., AF and AE operation). In step S1207, the state of the main switch 122 is checked. If the detected state is ON, the processing returns to step S1204; otherwise the processing returns to step S1201.

When the processing proceeds to step S1208, then the AE processing unit 103 performs the AE processing on the basis of the output from the image processing unit 110. In next step S1209, AFN=1 is set where AFN represents the number of AF scans in a continuous shooting operation. In next step S1210, the AF operation is performed in accordance with flowcharts of FIGS. 14A and 14B, which will be described below. In step S1211, the state of the SW2 is checked. If the detected state is ON, the processing proceeds to step S1214; otherwise the processing proceeds to step S1212. The SW2 functions to perform imaging after the SW1 is operated.

In step S1212, the state of SW1 is checked. If the detected state is not ON, the processing returns to step S1204. If the detected state is ON, AFN=2 is set in step S1213, and then the processing returns to step S1211, in which focus is locked until the SW2 is turned on or until the SW1 is turned off.

In step S1214, as a result of determining that the SW2 is in the ON state in step S1211, the shooting operation is performed in accordance with the flowchart of FIG. 11. In next step S1215, the remaining capacity of the image recording unit 114 is checked. If the detected remaining capacity is zero, the processing proceeds to step S1203; otherwise the processing proceeds to step S1216. In step S1216, it is checked whether the continuous shooting mode has been set (by selection via the drive mode switch 120 or as default selected via the shooting mode switch 119). If the continuous shooting mode has been set, the processing proceeds to step S1218; otherwise the processing proceeds to step S1217.

When the processing proceeds to step S1217, a captured image is displayed on the operation display unit 117 while the SW2 is in the ON state. If, in step S1217, the SW2 is in the OFF state, the processing proceeds to step S1212. In step S1218, if the SW2 is not in the ON state, the processing proceeds to step S1212. If, in step S1218, the SW2 is in the ON state, the processing proceeds to step S1210 to perform a continuous shooting operation and proceeds to the AF operation in the continuous shooting mode in accordance with flowcharts of FIGS. 14A and 14B, which will be described below.

Figure 14B:
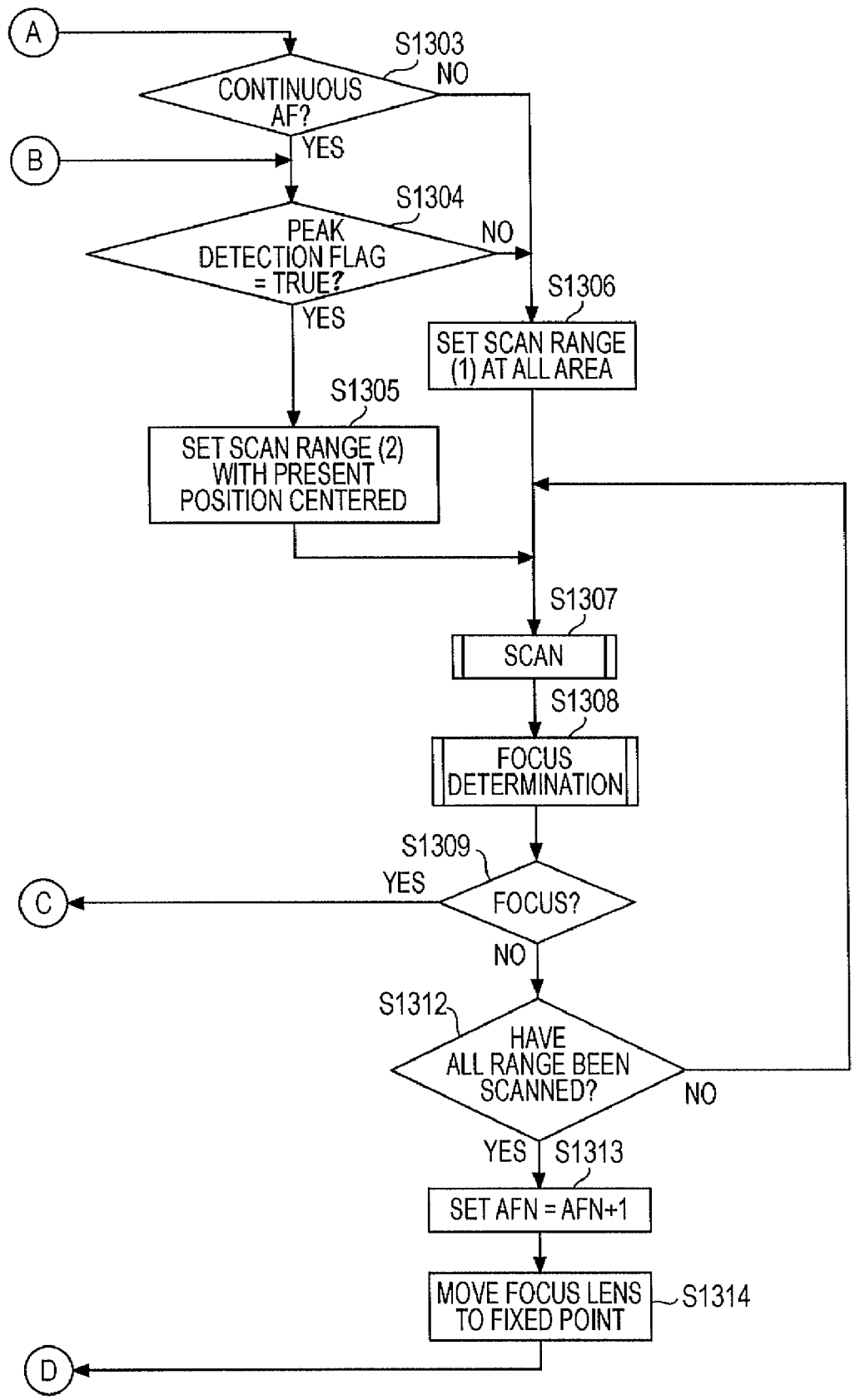

A subroutine for the AF operation in step S1210 in FIG. 13 is described below with reference to the flowcharts of FIGS. 14A and 14B.

In step S1301, StFlg=FALSE is set where StFlg represents whether a flash is being charged. In next step S1302, it is checked whether the continuous shooting mode has been set (by selection via the drive mode switch 120 or as default selected via the shooting mode switch 119). If the continuous shooting mode has been set, the processing proceeds to step S1315; otherwise the processing proceeds to step S1303.

In step S1303, it is checked whether the AF mode selected by the AF mode switch 121 is the continuous AF mode or the single AF mode. If the detected AF mode is the continuous AF mode, the processing proceeds to step S1304; if it is the single AF mode, the processing proceeds to step S1306. In step S1304, it is checked whether the peak detection flag in the flowchart of FIG. 3 is TRUE. If the peak detection flag is TRUE, the processing proceeds to step S1305; if it is FALSE, the processing proceeds to step S1306.

In step S1305, since the focus lens 104 lies adjacent to the focus position, at which the focus evaluated value is highest, due to the continuous AF operation, with the main aim of improving the accuracy of focusing, a narrow scan range centered about the present position of the focus lens is set. The scan range is set so as to satisfy the number of scan data required for the focus determination performed in accordance with the flowchart of FIG. 7 and so as not to have an unnecessary long length of a scan time. In contrast, when the processing proceeds to step S1306, all scannable area corresponding to a selected mode is set as the scan range.

Figure 6:
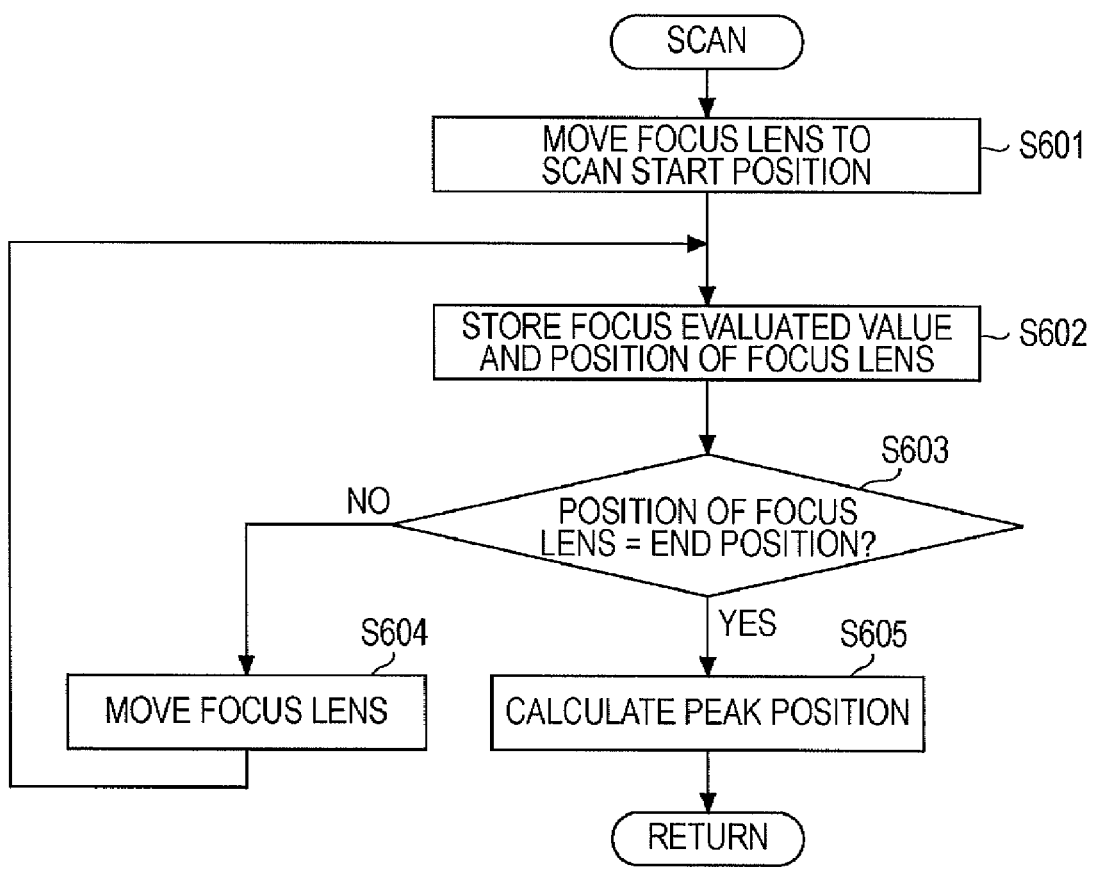
FIG. 6 is a flowchart of a subroutine for a scan (steps S406 and S418) shown in FIG. 4.

In next step S1307, a scan operation over the scan range set in step S1305 or S1306 is performed in accordance with the flowchart of FIG. 6. In next step S1308, the focus determination is performed on the basis of scan data stored in step S1307 in accordance with the flowchart of FIG. 7. In next step S1309, if the result of the focus determination in step S1308 is "○", the processing proceeds to step S1310. In step S1310, AFN=AFN+1 is set, and then the processing proceeds to step S1311. In step S1311, the focus lens 104 is moved to a peak position calculated in the scan operation in step S1307 or in step S1324, which will be described below. Then the processing proceeds to step S1325, which will be described below.

If, in step S1309, the result of the focus determination is "x", the processing proceeds to step S1312. In step S1312, it is checked whether scanning of all AF performable area corresponding to a selected mode has been completed. If the scanning has been completed, the processing proceeds to step S1313. In step S1313, AFN=AFN+1 is set, and then the processing proceeds to step S1314. In step S1314, the focus lens 104 is moved to a preset position called a fixed point. Then the processing returns to the flowchart of FIG. 13. If, in step S1312, scanning of all area has not been completed, the processing returns to step S1307.

If, in step S1302, the continuous shooting mode has been set, the processing proceeds to step S1315, as described above. In step S1315, it is checked whether AFN, which represents the number of AF operations in a continuous shooting operation, is one. If AFN is one, the processing proceeds to step S1304; if AFN is not one, the processing proceeds to step S1316. In the case of the first imaging operation in the continuous shooting mode, the AF operation is the same as in the continuous AF because it is impossible to predict an object on the basis of historical data on past focus positions. This intends to reduce a release time lag by setting a narrower scan range in step S1305. Accordingly, in the continuous shooting mode, it is useful that the continuous AF mode is set as default.

In step S1316, it is checked whether AFN=2. If AFN=2, the processing proceeds to step S1317; if not, the processing proceeds to step S1318. In step S1317, the position of the focus lens 104 in the first imaging operation is set as a center position of the scan range. When the width of the scan range is set so that not increasing the time intervals between continuous imaging operations is prioritized, the maximum width of the scan range is a scan width in which the AF operation is completed within an interval between continuous imaging operations in a state where the DRAM 113 used as a buffer has sufficient available capacity. In this step S1317, since there is no information on movement of an object, the maximum width of the scan range described above is set. More specifically, the total sum of the time required for acquiring the number of scan data enabling the focus determination in the flowchart of FIG. 7, the time required for moving to a scan start position, the time required for moving to a focus position after the completion of scanning, and the time required for performing various computations is set so as to be smaller than each of the time intervals between continuous imaging operations.

In step S1318, as a result of determining that AFN is not two in step S1316, it is checked whether power necessary to cause the flash 106 to emit light for the next imaging operation has been charged. If it is necessary to wait for completion of charging, StFlg=TRUE is set in step S1319, and then the processing proceeds to step S1321. If, in step S1318, the required power has been charged, StFlg=FALSE is set in step S1320, and then the processing proceeds to step S1321. In step S1321, it is checked whether AFN=3. If AFN=3, the processing proceeds to step S1322; if not, the processing proceeds to step S1323.

In step S1322, as a result of determining that AFN=3 in step S1321, since information on two focus positions (FP1 and FP2) for the first and second continuous imaging operations as focus-position historical information exists, the center position ObjP3 of the scan range is calculated by prediction of an object by a first order approximation represented by expression (3):

$$ObjP3 = FP2 + (FP2 - FP1) \times FpAdj3 \quad (3)$$

The parameter FpAdj(n) is a parameter for assigning weights to the result of the prediction of the object and the immediately preceding focus position and takes on values from 0 to 1. For the position of the focus position shown in FIG. 5, FpAdj(n) is one.

In step S1323, since information on at least three previous focus positions (FP1, FP2, and FP3) as the focus-position historical information exists, the center position ObjP4 of the scan range is calculated by prediction of an object by a second order approximation represented by expression (4):

$$ObjP4 = (FP1 - 3FP2 + 3FP3) \times FpAdj4 + FP3 \times (1 - FpAdj4) \quad (4)$$
$$= (FP1 - 3FP2 + 2FP3) \times FpAdj4 + FP3$$

Then in next step S1324, a scan operation is performed in accordance with the flowchart of FIG. 6, and the processing proceeds to step S1310. In step S1310, AFN=AFN+1 is set, and then the processing proceeds to step S1311.

For the second and subsequent continuous imaging operations, the focus determination is not performed. This is because, even if the result of the focus determination in the flowchart of FIG. 7 is "x", an imaging operation at the peak position for the previous imaging operation is more likely to have reduced blurring than an imaging operation after the focus lens 104 is driven to a fixed point. At the same time, focus is not displayed. The above scan range is set so that the number of scan points required for a focus determination described below is satisfied and so that the time required for scanning is not unnecessary long.

When the processing proceeds to step S1325 via steps S1310 and S1311, then it is checked whether StFlg=TRUE. If StFlg=TRUE, the processing proceeds to step S1318; if not, the subroutine for the AF operation is completed.

The scan width in steps S1322 and S1323 when StFlg=TRUE is set at the scan width when StFlg=FALSE was satisfied at the last time.

According to the second exemplary embodiment, even if the time interval to the next imaging operation is inevitably increased in the middle of a continuous shooting operation performed at regular time intervals because it is necessary to wait for completion of charging of a flash, the camera can track a moving object in the next imaging operation by performing the AF scan operation at regular time intervals and can continue prediction of the moving object.

Third Exemplary Embodiment

The second exemplary embodiment describes exemplary processing for a state in which, in the case where the time interval to the next imaging operation is inevitably increased in the middle of a continuous shooting operation performed at regular time intervals, the AF operation can be performed by the time the next imaging operation starts. However, if the AF operation cannot be performed by the time the next imaging operation starts (for example, if a buffer memory is full), it is impossible to perform prediction of a moving object even when the second exemplary embodiment is used.

The third exemplary embodiment describes exemplary processing for a state in which the time interval to the next imaging operation is inevitably increased in the middle of a continuous shooting operation performed at regular time intervals and the AF operation cannot be performed by the time the next imaging operation starts. The third exemplary embodiment is different from the second exemplary embodiment only in the AF operation in step S1210 and the shooting in step S1214 in FIG. 13 in the second exemplary embodiment.

Another subroutine for the AF operation in step S1210 in FIG. 13 in the third exemplary embodiment is described below with reference to FIGS. 15A and 15B.

Figure 15:
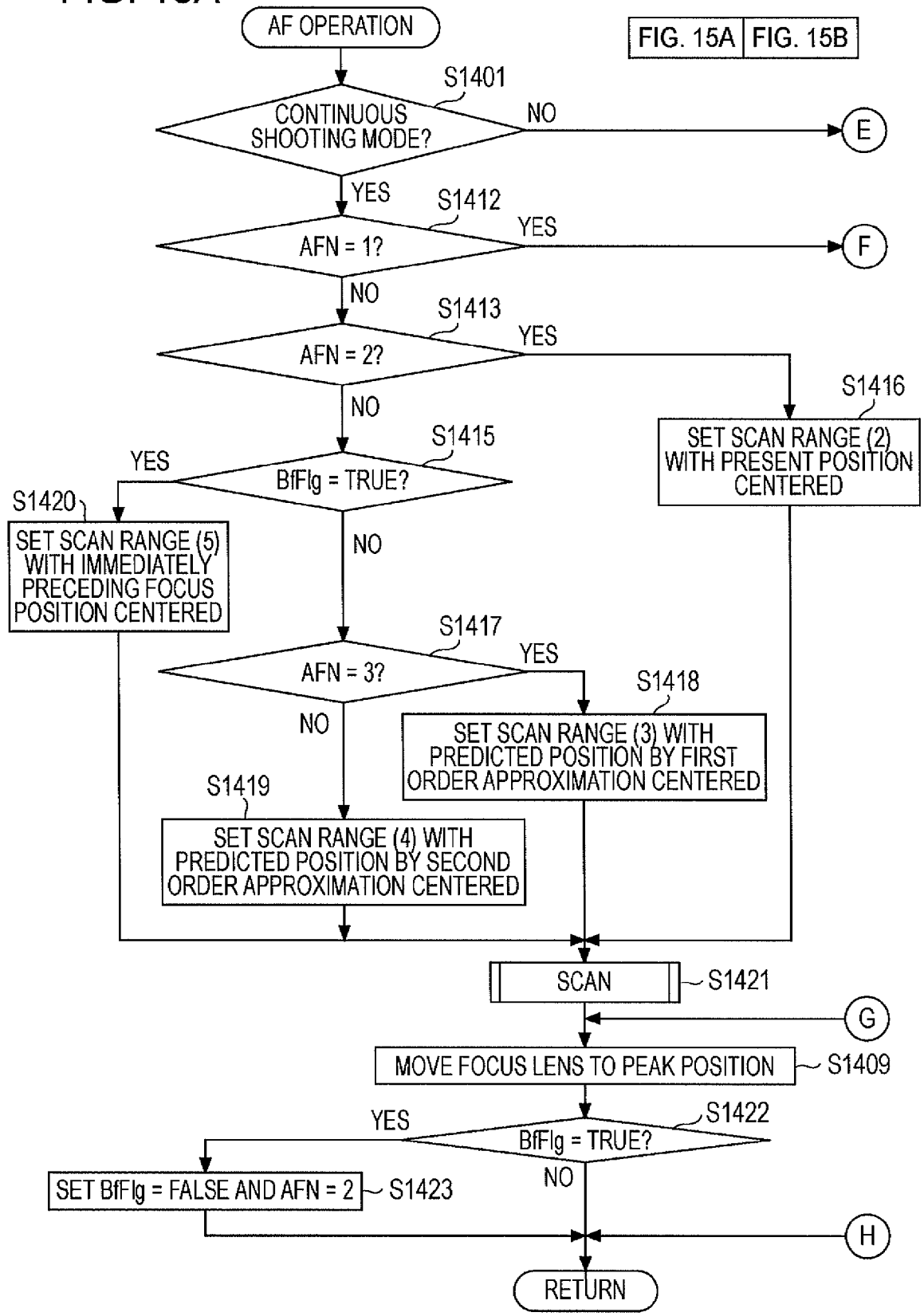
FIGS. 15A and 15B are flowcharts of a subroutine for an AF operation according to the third exemplary embodiment.
Figure 15B:
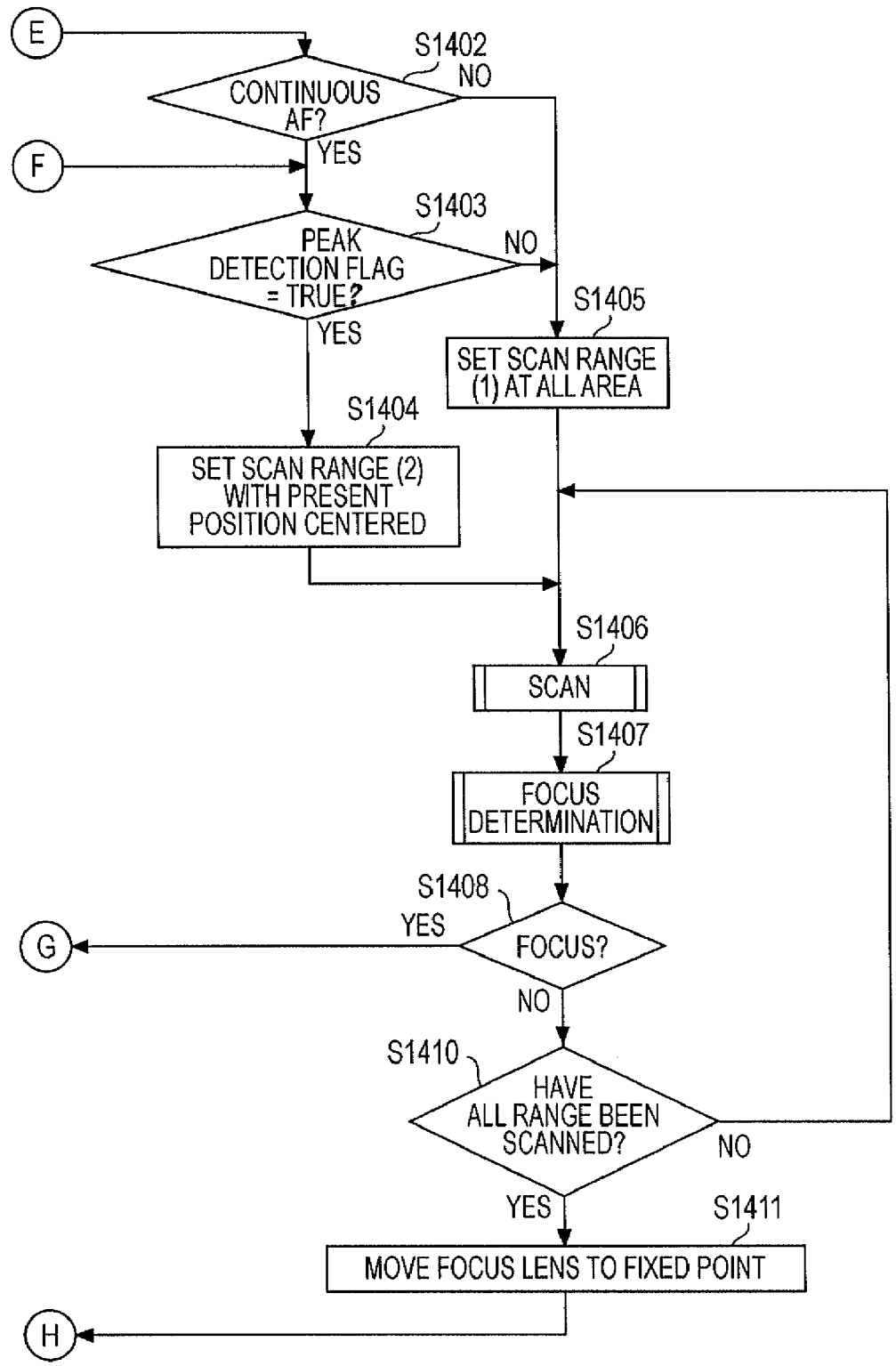

FIGS. 15A and 15B are flowcharts of processes for the AF operation of the electronic camera according to the third exemplary embodiment.

In step S1401, it is checked whether the continuous shooting mode has been set (by selection via the drive mode switch 120 or as default selected via the shooting mode switch 119). If the continuous shooting mode has been set, the processing proceeds to step S1412; otherwise the processing proceeds to step S1402.

In step S1402, it is checked whether the AF mode selected by the AF mode switch 121 is the continuous AF mode or the single AF mode. If the detected AF mode is the continuous AF mode, the processing proceeds to step S1403; if it is the single AF mode, the processing proceeds to step S1405. In step S1403, it is checked whether the peak detection flag in the flowchart of FIG. 3 is TRUE. If the peak detection flag is TRUE, the processing proceeds to step S1404; if it is FALSE, the processing proceeds to step S1405.

In step S1404, since the focus lens 104 lies adjacent to the focus position, at which the focus evaluated value is highest, due to the continuous AF operation, with the main aim of improving the accuracy of focusing, a narrow scan range centered about the present position of the focus lens is set. The scan range is set so as to satisfy the number of scan data required for the focus determination performed in accordance with the flowchart of FIG. 7 and so as not to have an unnecessary long length of a scan time. In contrast, when the processing proceeds to step S1405, all AF performable area corresponding to a selected mode is set as the scan range.

In next step S1406, a scan operation over the scan range set in step S1404 or S1405 is performed in accordance with the flowchart of FIG. 6. In next step S1407, the focus determination is performed on the basis of scan data stored in step S1406 in accordance with the flowchart of FIG. 7. In next step S1408, if the result of the focus determination in step S1407 is "○", the processing proceeds to step S1409; if the result is "x", the processing proceeds to step S1410. In step S1410, it is checked whether scanning of all AF performable area corresponding to a selected mode has been completed. If scanning of all area has been completed, the processing proceeds to step S1411; if scanning of all area has not been completed, the processing returns to step S1406. In step S1411, the focus lens 104 is moved to a preset position called a fixed point. When the processing proceeds to step S1409 from step S1408, then the focus lens 104 is moved to a peak position calculated in the scan operation in step S1406 or in step S1421, which will be described below. Then the processing proceeds to step S1422, which will be described below.

If, in step S1401, the continuous shooting mode has been set, the processing proceeds to step S1412, as described above. In step S1412, it is checked whether AFN=1, where AFN represents the number of AF operations in a continuous shooting operation. If AFN=1, the processing proceeds to step S1403; if not, the processing proceeds to step S1413. In the case of the first imaging operation in the continuous shooting mode, the AF operation is the same as in the continuous AF because it is impossible to predict an object on the basis of historical data on past focus positions. This intends to reduce a release time lag by setting a narrower scan range in step S1404. Accordingly, in the continuous shooting mode, it is useful that the continuous AF mode is set as default.

In step S1413, it is checked whether AFN=2. If AFN=2, the processing proceeds to step S1416; if not, the processing proceeds to step S1415. In step S1416, the position of the focus lens 104 in the first imaging operation is set as a center position of the scan range. When the width of the scan range is set so that not increasing the time interval between continuous imaging operations is prioritized, the maximum width of the scan range is a scan width in which the AF operation is completed within an interval between continuous imaging operations in a state where the DRAM 113 used as a buffer has sufficient available capacity. In this step S1416, since there is no information on movement of an object, the maximum width of the scan range described above is set. More specifically, the total sum of the time required for acquiring the number of scan data enabling the focus determination in the flowchart of FIG. 7, the time required for moving to a scan start position, the time required for moving to a focus position after the completion of scanning, and the time required for performing various computations is set so as to be smaller than each of the time intervals between continuous imaging operations.

Figure 16:
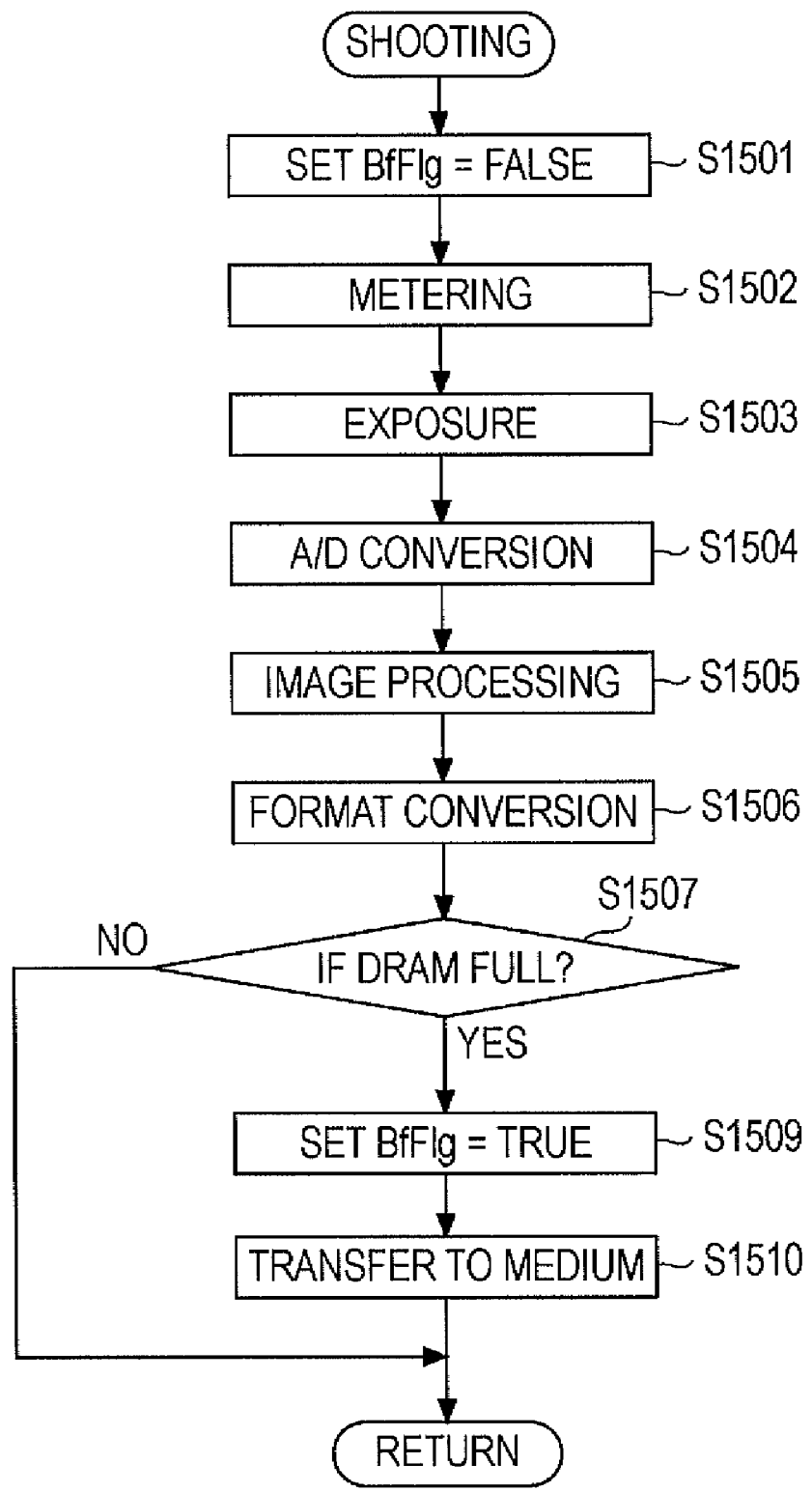
FIG. 16 is a flowchart of a subroutine for a shooting operation according to the third exemplary embodiment.

When the processing proceeds to step S1415 from step S1413, then it is checked whether the DRAM 113 becomes full in a subroutine for a shooting operation in FIG. 16, which will be described below, (BfFlg=TRUE or not). If BfFlg=TRUE, the processing proceeds to step S1420; if not, the processing proceeds to step S1417. In step S1417, it is checked whether AFN=3. If AFN=3, the processing proceeds to step S1418; if not, the processing proceeds to step S1419.

In step S1418, since information on two focus positions (FP1 and FP2) for the first and second continuous imaging operations as focus-position historical information exists, the center position ObjP3 of the scan range is calculated by prediction of an object by a first order approximation represented by expression (5):

$$ObjP3=FP2+(FP2-FP1) \times FpAdj3 \quad (5)$$

The parameter FpAdj(n) is a parameter for assigning weights to the result of the prediction of the object and the immediately preceding focus position and takes on values from 0 to 1. For the position of the focus position show in FIG. 5, FpAdj(n) is one.

In step S1419, since information on at least three previous focus positions (FP1, FP2, and FP3) as the focus-position historical information exists, the center position ObjP4 of the scan range is calculated by prediction of an object by a second order approximation represented by expression (6):

$$ObjP4 = (FP1 - 3FP2 + 3FP3) \times FpAdj4 + FP3 \times (1 - FpAdj4) \quad (6)$$
$$= (FP1 - 3FP2 + 2FP3) \times FpAdj4 + FP3$$

In step S1420, since the DRAM 113 is full (no available space) and thus the time interval between the current imaging operation and the immediately preceding imaging operation is longer than the time interval between the previous two imaging operations in the focus-position historical information, information on the previous two focus positions cannot be used in approximation expression. Accordingly, the position of the focus lens in the immediately preceding imaging operation is set as the center of the scan range. In addition, since prediction of a moving object is impossible, the scan range at this time is expanded from the scan range in steps S1418 and S1419 by $\alpha$ times ($\alpha > 1$) so that the camera can track the moving object.

In step S1421, a scan operation is performed in accordance with the flowchart of FIG. 6, and the processing proceeds to step S1409. In step S1409, the focus lens 104 is moved to the peak position. For the second and subsequent continuous imaging operations, the focus determination is not performed. This is because, even if the result of the focus determination in the flowchart of FIG. 7 is "x", an imaging operation at the peak position for the previous imaging operation is more likely to have reduced blurring than an imaging operation after the focus lens 104 is driven to a fixed point. At the same time, focus is not displayed.

When the processing proceeds to step S1422 via step S1409, then it is checked whether BfFlg=TRUE. If BfFlg=TRUE, the processing proceeds to step S1423; if not, the subroutine for the AF operation is completed. In step S1423, BfFlg=FALSE and AFN=2 are set, and then the subroutine for the AF operation is completed.

Another subroutine for the shooting operation in step S1214 in FIG. 13 in the third exemplary embodiment is described below with reference to FIG. 16. FIG. 16 is a flowchart of the shooting operation of the electronic camera according to the third exemplary embodiment.

In step S1501, BfFlg is set at FALSE where BfFlg represents whether the DRAM 113 is full. In next step S1502, the brightness of an object is measured. In subsequent step S1503, in response to the brightness of the object measured in step S1502, the image pickup element 108 is exposed. An image formed on the surface of the image pickup element 108 is photoelectrically converted into an analog signal. In step S1504, the analog signal is sent to the A/D conversion unit 109, and it is converted into a digital signal after being subjected to pre-processing, such as noise reduction of noise output from the image pickup element 108 and nonlinear processing.

In step S1505, the white balance of a signal output from the A/D conversion unit 109 is adjusted by the WB processing unit 111, and the signal is processed so as to be a proper output image signal in the image processing unit 110. In next step S1506, the format of the output image signal is converted into the JPEG format or other formats by the format conversion unit 112, and it is temporarily stored in the DRAM 113. In next step S1507, it is checked whether the DRAM 113 is full. If the DRAM 113 is full, the processing proceeds to step S1509; if the DRAM 113 has sufficient available capacity, the subroutine for the shooting operation is completed. In step S1509, BfFlg=TRUE is set. In next step S1510, data in the DRAM 113 is transferred to an external storage medium, such as a memory in the camera or a memory card mounted in the camera, and is stored therein.

According to the third exemplary embodiment, even if the time interval to the next imaging operation is inevitably increased in the middle of a continuous shooting operation performed at regular time intervals and the AF operation cannot be performed by the time the next imaging operation starts, the camera can track a moving object by expanding a scan range of the focus lens 104. Therefore, even in such a case, the camera can track the moving object at the next imaging operation and can continue prediction of the moving object.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-025913 filed Feb. 2, 2006 and No. 2006-042450 filed Feb. 20, 2006, which are hereby incorporated by reference herein in their entirety.

What is claimed is:

1. A focusing device comprising:
a focus-lens driving unit configured to drive a focus lens;
a control unit configured to control the focus-lens driving unit to move the focus lens through a predetermined range, to determine a state of focus on the basis of a signal output from an image pickup unit, the signal being acquired in association with movement of the focus lens through the predetermined range, and to control the focus-lens driving unit so that an image of an object is in focus; and
a storing unit configured to store a position of the focus lens in focus acquired by the control unit,
wherein the control unit is configured to calculate, on the basis of the position of the focus lens stored in the storing unit, a datum point of the range of movement of the focus lens and to shift the range of movement of the focus lens in response to the calculated datum point in a direction in which the object moves.

2. The focusing device according to claim 1, wherein the control unit is configured to move the range of movement of the focus lens through a range wider than the range of movement based on the calculation of the datum point and to determine the state of focus, when shifting the range of movement of the focus lens in the direction in which the object moves.

3. The focusing device according to claim 1, wherein the control unit is configured to store a position of the focus lens in focus and to calculate the datum point on the basis of the stored position of the focus lens.

4. The focusing device according to claim 1, wherein the control unit is configured to calculate the datum point in a continuous shooting operation.

5. An image pickup apparatus comprising:
the focusing device according to claim 1; and
an image pickup element.

6. A method for controlling a focusing device including a focus-lens driving unit configured to drive a focus lens; a control unit configured to control the focus-lens driving unit to move the focus lens through a predetermined range, to determine a state of focus on the basis of a signal output from an image pickup unit, the signal being acquired in association with movement of the focus lens through the predetermined range, and to control the focus-lens driving unit so that an image of an object is in focus; and a storing unit configured to store a position of the focus lens in focus acquired by the control unit, the method comprising:
   calculating a datum point of the range of movement of the focus lens for moving the focus lens, on the basis of the position of the focus lens stored in the storing unit; and
   shifting the range of movement of the focus lens in response to the calculated datum point in a direction in which the object moves.

* * * * *